US012566439B2

(12) United States Patent
Topan et al.

(10) Patent No.: US 12,566,439 B2
(45) Date of Patent: Mar. 3, 2026

(54) DETERMINING PERCEPTION ZONES FOR OBJECT DETECTION IN AUTONOMOUS SYSTEMS AND APPLICATIONS

(71) Applicant: NVIDIA Corporation, Santa Clara, CA (US)

(72) Inventors: Sever Ioan Topan, Burnaby (CA); Karen Yan Ming Leung, Los Altos, CA (US); Yuxiao Chen, Sunnyvale, CA (US); Pritish Tupekar, Santa Clara, CA (US); Edward Fu Schmerling, Los Altos, CA (US); Hans Jonas Nilsson, Los Gatos, CA (US); Michael Cox, Menlo Park, CA (US); Marco Pavone, Stanford, CA (US)

(73) Assignee: NVIDIA Corporation, Santa Clara, CA (US)

( * ) Notice: Subject to any disclaimer, the term of this patent is extended or adjusted under 35 U.S.C. 154(b) by 498 days.

(21) Appl. No.: 17/942,551

(22) Filed: Sep. 12, 2022

(65) Prior Publication Data
US 2024/0085914 A1 Mar. 14, 2024

(51) Int. Cl.
*G05D 1/00* (2024.01)
*G06V 20/58* (2022.01)

(52) U.S. Cl.
CPC ......... *G05D 1/0214* (2013.01); *G05D 1/0253* (2013.01); *G06V 20/58* (2022.01); *G06V 2201/07* (2022.01)

(58) Field of Classification Search
CPC .... G05D 1/0214; G05D 1/0253; G06V 20/58; G06V 2201/07; G06V 10/98; G06V 10/82
See application file for complete search history.

(56) References Cited

U.S. PATENT DOCUMENTS 11,370,424 B1 * 6/2022 Cohen ................... G06V 10/25
12,071,157 B1 * 8/2024 Prioletti ........... B60W 50/0098
(Continued)

OTHER PUBLICATIONS

ISO 26262, "Road vehicle—Functional safety," International standard for functional safety of electronic system, https://en.wikipedia.org/wiki/ISO_26262, accessed on Sep. 13, 2021, 8 pgs.
(Continued)

*Primary Examiner* — Ig T An
(74) *Attorney, Agent, or Firm* — IRON SUMMIT IP LLP

(57) ABSTRACT
In various examples, techniques for determining perception zones for object detection are described. For instance, a system may use a dynamic model associated with an ego-machine, a dynamic model associated with an object, and one or more possible interactions between the ego-machine and the object to determine a perception zone. The system may then perform one or more processes using the perception zone. For instance, if the system is validating a perception system of the ego-machine, the system may determine whether a detection error associated with the object is a safety-critical error based on whether the object is located within the perception zone. Additionally, if the system is executing within the ego-machine, the system may determine whether the object is a safety-critical object based on whether the object is located within the perception zone.

20 Claims, 17 Drawing Sheets

(56) References Cited

U.S. PATENT DOCUMENTS

| | | | |
|---|---|---|---|
| 2010/0324771 A1* | 12/2010 | Yabushita | G05D 1/0246 |
| | | | 701/25 |
| 2020/0133281 A1* | 4/2020 | Gomez Gutierrez | |
| | | | G05D 1/0214 |
| 2021/0405638 A1* | 12/2021 | Boyraz | G06V 20/64 |

OTHER PUBLICATIONS

Topan, Sever, et al.; "Interaction-Dynamics-Aware Perception Zones for Obstacle Detection Safety Evaluation", Jun. 2022; 10 pgs.

Albus, James S.; "4D-RCS A Reference Model Architecture for Intelligent Unmanned Ground Vehicles" Unmanned Ground Vehicle Technology IV, vol. 4715, pp. 303-310, 2002, 8 pgs.

Volk, G., et al; "A Comprehensive Safety Metric to Evaluate Perception in Autonomous Systems", In Proc. IEEE Int. Conf. on Intelligent Transportation Systems, 2020.

Bansal, Ayoosh, et al.; "Risk Ranked Recall: Collision Safety Metric for Object Detection Systems in Autonomous Vehicles"; https://arxiv.org/abs/2106.04146; Jun. 8, 2021, 4 pgs.

Mitchell, I.M.; et al.; "A Time-Dependent Hamilton-Jacobi Formulation of Reachable Sets for Continuous Dynamic Games", IEEE Transactions on Automatic Control, vol. 50, No. 7, pp. 947-957, 2005.

Margellos, Kostas, et al.; "Hamilton-Jacobi Formulation for Reach-Avoid Differential Games", IEEE Transaction on Automatic Control, vol. 56, No. 8, pp. 1849-1861, 2011.

Bansal, S., et al.; "Hamilton-Jacobi Reachability: A Brief Overview and Recent Advances"; https://arxiv.org/abs/1709.07523; Sep. 21, 2017, 12 pgs.

Caesar, H., et al.: "NuScenes: A Multimodal Dataset for Autonomous Driving"; https://arxiv.org/abs/1903.11027; May 5, 2020, 16 pgs.

Dahl, J.; "Collision Avoidance: A Literature Review on Threat-Assessment Techniques"; IEEE Transactions on Intelligent Vehicles, vol. 4, No. 1, pp. 101-113, 2019.

Aravantinos, V., et al.; "Making the Relationship between Uncertainty Estimation and Safety Less Uncertain"; in Conf. on Design, Automation and Test in Europe, 2020.

Lyssenko, M., et al.; "From Evaluation to Verification: Towards Task-Oriented Relevance Metrics for Pedestrian Detection in Safety-Critical Domains"; in IEEE/CVF Conf. on Computer Vision and Pattern Recognition Workshops, Jun. 2021, p. 38-45.

Hoss, M.; "A Review of Testing Object-Based Environment Perception for Safe Automated Driving"; https://arxiv.org/abs/2102.08460; Feb. 16, 2021, 23 pgs.

Philion, J., et al.; "Learning to Evaluate Perception Models Using Planner-Centric Metrics"; https://arxiv.org/abs/2004.08745; Apr. 19, 2020, 10 pgs.

Guo, Y., et al.; "The Efficacy of Neural Planning Metrics: A Meta-Analysis of PKL on NuScenes"; https://arxiv.org/abs/2010.09350; Jul. 13, 2021, 4 pgs.

Berk, M., et al.; "Assessing the Safety of Environment Perception in Automated Driving Vehicles"; SAE International Journal of Transportation Safety, vol. 8, No. 1, 2020.

Salay, R., et al.; "A Safety Analysis Method for Perceptual Components in Automated Driving", in IEEE Int. Symp. On Software Reliability Engineering, 2019.

Leung, K., et al.; "Towards the Unification and Data-Driven Synthesis of Autonomous Vehicle Safety Concepts"; https://arxiv.org/abs/2107.14412, Jun. 20, 2022, 9 pgs.

Shalev-Shwartz, S., et al.; "On a Formal Model of Safe and Scalable Self-Driving Cars"; https://arxiv.org/abs/1708.06374, Oct. 27, 2018, 27 pgs.

Bajcsy, A., et al.; "An Efficient Reachability-Based Framework for Provably Safe Autonomous Navigation in Unknown Environments"; https://arxiv.org/abs/1905.00532, May 1, 2019, 10 pgs.

Leung, K., et al.; "On Infusing Reachability-Based Safety Assurance within Planning Frameworks for Human-Robot Vehicle Interactions"; https://arxiv.org/abs/2012.03390, Dec. 6, 2020, 18 pgs.

Fisac, J.F.; et al.; "A General Safety Framework for Learning-Based Control in Uncertain Robotic Systems"; https://arxiv.org/abs/1705.01292; Feb. 14, 2018, 16 pgs.

Schmerling, E.; "HJ Reachability in JAX" Available at https://github.com/StanfordASL/hj_reachability.

Vaskov, S., et al.; "Not-at-Fault Driving in Traffic: A Reachability-Based Approach"; in Proc. IEEE Int. Conf. on Intelligent Transportation Systems, 2019.

Zhu, B., et al.; "Class-Balanced Grouping and Sampling for Point Cloud 3D Object Detection"; https://arxiv.org/abs/1908.09492; Aug. 26, 2019, 8 pgs.

\* cited by examiner

600

DETERMINE A LOCATION OF AN OBJECT WITHIN AN
ENVIRONMENT
B602

DETERMINE A VELOCITY OF AN EGO-MACHINE
B604

DETERMINE A PERCEPTION ZONE BASED AT LEAST IN PART
ON THE LOCATION OF THE OBJECT AND THE VELOCITY OF
THE EGO-MACHINE
B606

DETERMINE A TYPE ASSOCIATED WITH THE OBJECT BASED
AT LEAST IN PART ON THE PERCEPTION ZONE
B608

700

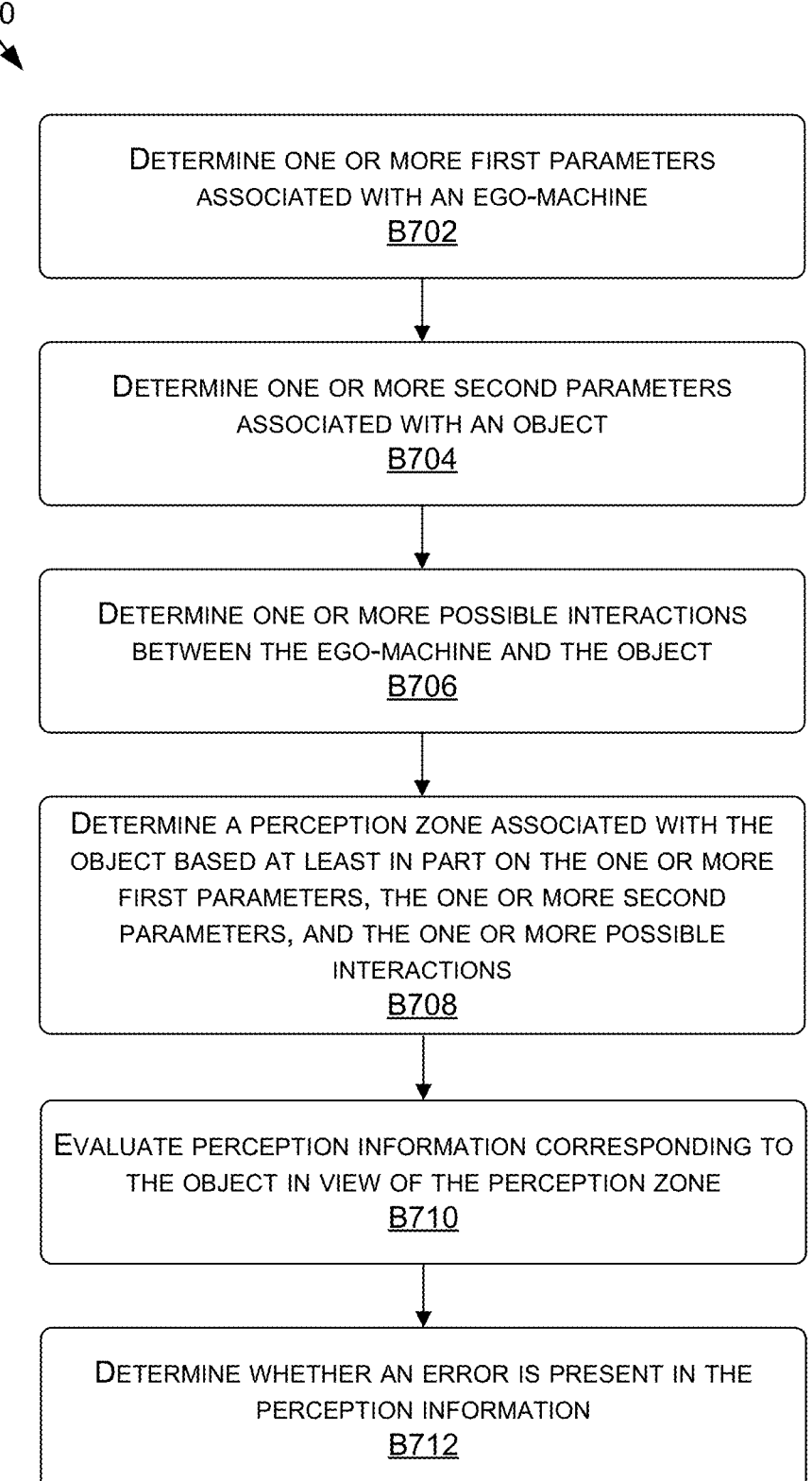

DETERMINE ONE OR MORE FIRST PARAMETERS
ASSOCIATED WITH AN EGO-MACHINE
B702

DETERMINE ONE OR MORE SECOND PARAMETERS
ASSOCIATED WITH AN OBJECT
B704

DETERMINE ONE OR MORE POSSIBLE INTERACTIONS
BETWEEN THE EGO-MACHINE AND THE OBJECT
B706

DETERMINE A PERCEPTION ZONE ASSOCIATED WITH THE
OBJECT BASED AT LEAST IN PART ON THE ONE OR MORE
FIRST PARAMETERS, THE ONE OR MORE SECOND
PARAMETERS, AND THE ONE OR MORE POSSIBLE
INTERACTIONS
B708

EVALUATE PERCEPTION INFORMATION CORRESPONDING TO
THE OBJECT IN VIEW OF THE PERCEPTION ZONE
B710

DETERMINE WHETHER AN ERROR IS PRESENT IN THE
PERCEPTION INFORMATION
B712

DETERMINING PERCEPTION ZONES FOR OBJECT DETECTION IN AUTONOMOUS SYSTEMS AND APPLICATIONS

BACKGROUND

Vehicles, such as autonomous vehicles or semi-autonomous vehicles, use perception systems to process sensor data from sensors of the vehicles in order to detect objects within environments for which the vehicles are navigating. Downstream systems of the vehicles, such as planning systems and/or control systems, then use the locations of the objects to determine control operations for the vehicles. As such, when errors occur with the perception systems, the downstream systems may be affected. As a first example, if a perception system of a vehicle does not detect an object that is located along a path of the vehicle, a planning system and/or a control system may cause the vehicle to continue navigating along the path until, for example, another system (e.g., a collision or obstacle avoidance system) is activated to come to a stop or avoid the object. This may cause extend travel times or result in sudden maneuvers that may be uncomfortable for passengers of the vehicle. As a second example, if a perception system of a vehicle inaccurately determines that an object is located along a path of the vehicle where no object is present, a planning system and/or a control system may cause the vehicle to navigate in reliance or with respect to the presence of the object—such as to slow down or come to a stop. As such, it is critical that the perception systems of the vehicles are reliable in detecting objects and, as a result, the perception systems of the vehicles must generally satisfy stringent safety requirements via rigorous verification and validation (V&V) regimes.

Various metrics have been created to evaluate the performance of perception systems. For example, evaluation metrics, such as Intersection over Union (IoU) and False Positive (FP) rates, are task-agnostic and provide comparability across a variety of benchmarks. For instance, these task-agnostic evaluation metrics determine the error rates of perception systems. However, such task-agnostic metrics do not adequately quantify how well a perception system will actually perform when integrated into a full autonomy stack and deployed into the real-world. This is because the type of misdetection may lead to very different behaviors in downstream tasks. For example, it has been shown that there is a linear degradation in the performance of task-aware evaluation metrics the further away an object is from a vehicle, therefore indicating that the task-aware evaluation metrics may not be sufficient or as effective as desired in validating safety.

Because of this, task-aware metrics have been used when evaluating perception systems. For instance, one example of a planning-aware metric (e.g., a task-aware metric) uses KL-divergence to compare how different the vehicle's plans are with noisy and with perfect detection. Additionally, another task-aware metric proposes combining scores measuring detection quality, collision potential, and time needed to make the detection. Furthermore, other task-aware metrics rank an object based on the object's perceived or simulated risks (imminent, potential, none) of a collision or other incident, as defined using a simplified forward reachable set of computations under an isotropic force assumption. While such task-aware metrics are useful in comparing the relative performance of a perception system over another perception system, the task-aware metrics are not useful in validating whether a perception system is sufficient in supporting safe vehicle operations.

Additionally, safety-critical perception error validation may include demonstrating that a perception system can operate within an acceptable risk level specified by the appropriate regulatory body or industry safety standard. The safety-critical perception error rate is the rate of the perception errors multiplied by the fraction of safety-critical perception errors. However, for safety-critical perception error validation, it is unclear and non-trivial how to compute a value for the fraction of the safety-critical errors. One conventional technique to determine such safety-critical errors is to determine that a perception error is unsafe when a simulated collision or other incident could have been prevented if the error had not occurred. However, precisely determining safety-critical errors using such a technique is challenging, because obtaining ground truth data is often difficult and/or time intensive.

Yet another conventional technique to determine safety-critical errors is to determine which objects in the environment are safety-critical and ensure that perception performance is high for those objects. For example, one approach includes determining that an object is safety-critical if the vehicle and the object would still collide before coming to a stop when braking. Another approach includes determining that an object is safety-critical if the vehicle and the object would collide when the vehicle and the object continue moving with a constant velocity. While these approaches consider the object's dynamics, they nonetheless make assumptions about the object's behavior, which the vehicle would not typically have control over. Furthermore, these approaches do not account for possible reactions of the vehicle and/or the object.

Other approaches to determine safety-critical objects include determining that all objects located within a radius around the vehicle are safety-critical objects. However, these approaches may still ignore safety-critical objects that are located outside of the radius, such as an object with a high velocity that poses a risk to the vehicle (e.g., is moving in a direction of the vehicle). Additionally, these approaches may determine that objects that provide little to no risk to the vehicle are safety-critical objects, such as an object that is located within the radius but moving in a high velocity away from the vehicle. Because these approaches do not account for the object's dynamics and/or the vehicle's dynamics, implementations according to these approaches can suffer from inaccuracies—some of which may be severe and/or safety critical.

SUMMARY

Embodiments of the present disclosure relate to techniques for determining perception zones for object detection. Systems and methods are disclosed that use a dynamic model of an ego-machine (e.g., the ego-machine's dynamics, the ego-machine's potential behavior, etc.), a dynamic model for an object (e.g., the object's dynamics, the object's potential behavior, etc.), and one or more possible interactions (e.g., all possible interactions) between the ego-machine and the object to determine a zone (also referred to as a "perception zone") associated with the vehicle-object interaction. The techniques further include determining that the object is safety-critical (and/or an error is a safety-critical error) when the object is located within the perception zone or determining that the object is not safety-critical (and/or the error is not the safety-critical error) when the object is located outside of the perception zone. As such, the current techniques are able to generate perception zones that are sufficiently large to capture all safety-critical objects while still omitting objects that are not safety-critical to the ego-machine.

Because of this, the systems of the present disclosure provide improvements over conventional systems (such as those described above) that merely use an object's dynamics and/or an assumed behavior for the object. For example, by using the dynamic model for the ego-machine, the dynamic model for the object, and the one or more possible interactions (e.g., all possible interactions) between the ego-machine and the object, the described systems determine a perception zone that captures the object whenever the object is safety critical, unlike conventional systems that evaluate object behavior independent from and/or without consideration of the behavior of the ego-machine. Additionally, the current systems provide improvements over conventional systems that use a radius around the ego-machine to determine the safety-critical objects. For example, and as discussed above, such conventional systems may wrongly identify objects located within the radius as being safety-critical and/or may wrongly identify objects located outside of the radius as not being safety-critical. In contrast, the described systems determine a perception zone using the dynamic models for the ego-machine and the object, thus taking into consideration the dynamics and potential behaviors of the ego-machine and/or the object when determining whether the object is safety-critical with respect to the ego-machine.

BRIEF DESCRIPTION OF THE DRAWINGS

The present systems and methods for determining perception zones for object detection are described in detail below with reference to the attached drawing figures, wherein:

FIG. 7 is a flow diagram showing a method for determining a perception zone associated with an object, in accordance with some embodiments of the present disclosure;

DETAILED DESCRIPTION

Figure 1:
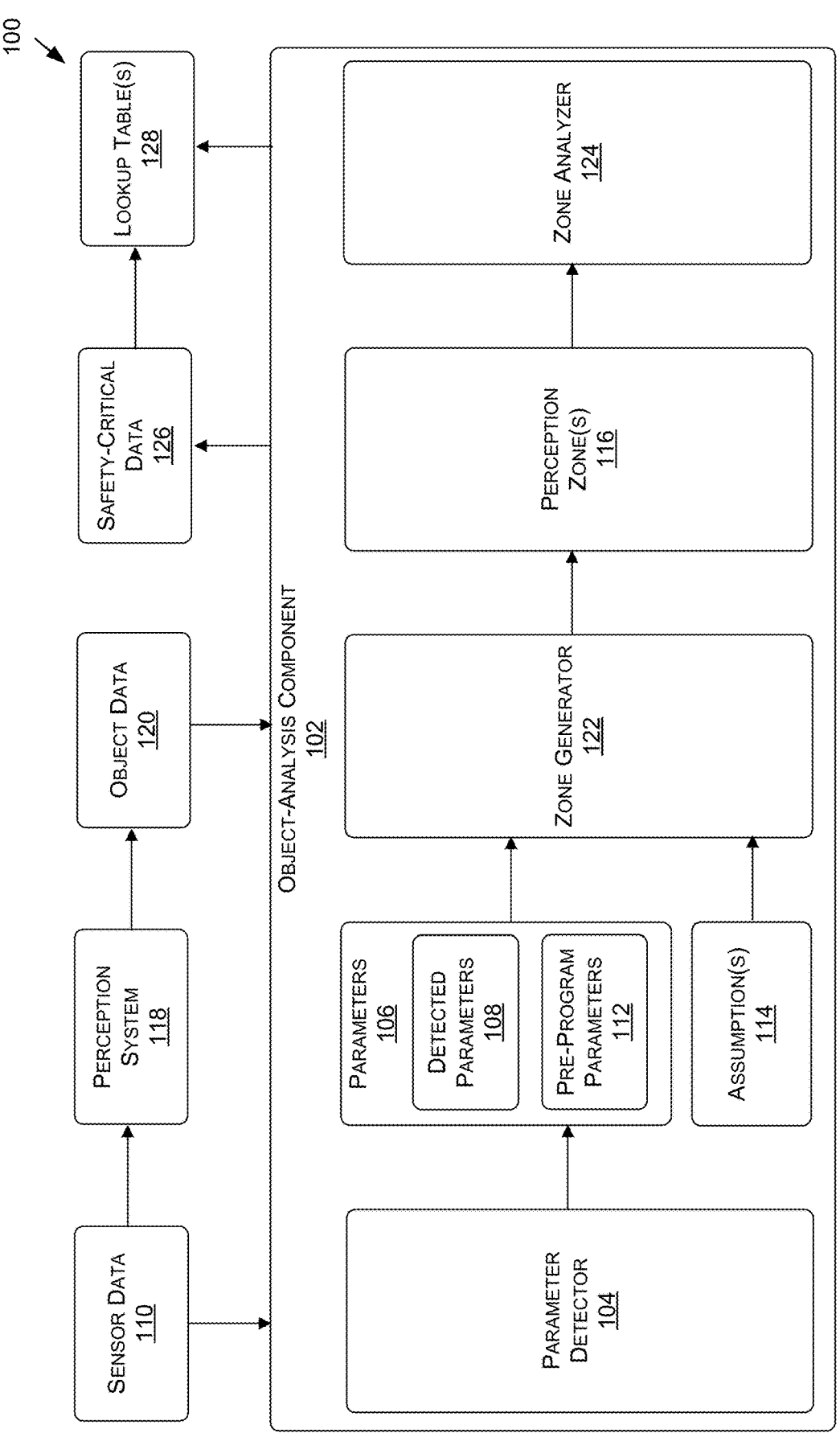
FIG. 1 illustrates an example data flow diagram for a process of determining a perception zone for an object and then using the perception zone to determine whether the object is a safety-critical object, in accordance with some embodiments of the present disclosure.

Systems and methods are disclosed related to techniques for determining perception zones for object detection. Although the present disclosure may be described with respect to an example autonomous vehicle 900 (alternatively referred to herein as "vehicle 900" or "ego-machine 900," an example of which is described with respect to FIGS. 9A-9D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to object detection, this is not intended to be limiting, and the systems and methods described herein may be used in augmented reality, virtual reality, mixed reality, robotics, security and surveillance, autonomous or semi-autonomous machine applications, and/or any other technology spaces where object detection may be used.

For instance, a system (which may correspond to the ego-machine, may be included as part of a simulation and/or testing environment, etc.) may use a perception system of the ego-machine to process sensor data in order to detect an object within an environment. The system may then determine one or more parameters for the object. As described herein, the parameter(s) for the object may include, but is not limited to, a type (e.g., a vehicle, a pedestrian, a scooter, etc.)

of the object, a location of the object, a velocity of the object (e.g., a current velocity, a maximum velocity, etc.), an acceleration of the object, a deceleration of the object, a size of the object, a direction of travel of the object, steering limits (e.g., a turning radius) for the object, and/or any other parameter. In some examples, the system determines one or more of the parameters based on further processing the sensor data. Additionally, or alternatively, in some examples, the system determines one or more of the parameters as a pre-programmed parameter(s). For example, the system may be pre-programmed with a parameter(s) for different types of objects, such as the acceleration, the steering limits, and/or the like.

The system may further determine one or more parameters associated with the ego-machine. As described herein, the parameter(s) for the ego-machine may include, but is not limited to, a location of the ego-machine, a velocity of the ego-machine (e.g., a current velocity), a deceleration of the ego-machine, a time period for the ego-machine to begin decelerating, a size of the ego-machine, a direction of travel of the ego-machine, steering limits (e.g., a turning radius) for the ego-machine, and/or any other parameter. In some examples, the system determines one or more of the parameters based on sensor data. Additionally, or alternatively, in some examples, the system determines one or more of the parameters as a pre-programmed parameter(s). For example, the system may be pre-programmed with the parameter(s) for the deceleration and/or the time period for the ego-machine to begin decelerating.

In order to be conservative and maximize the safety of the ego-machine and/or the object, the system may then use, in addition to the parameters, one or more assumptions when determining a perception zone for the object. For instance, in some examples, the system may use a first assumption that the ego-machine and the object will actively attempt to steer toward one another. For example, the system may determine that the ego-machine will turn in a direction(s) toward the object and that the object may turn in a direction(s) toward the ego-machine while, e.g., at the same time accelerating. In some examples, the system may use a second assumption that no obstacles are located between the ego-machine and the object and/or that the ego-machine and the object are navigating along a flat road. This way, the ego-machine and the object are able to navigate using the shortest path, which may increase the probability of a simulated collision.

The system may then use the parameter(s) for the ego-machine, the parameter(s) for the object, and the assumption(s) (which may together represent the dynamic models for the ego-machine and the object) to determine the perception zone for the object. In some examples, the system determines the perception zone using one or more reachability techniques, such as Hamilton-Jacobi (HJ) reachability, forward reachability, backward reachability, sampling-based reachability, a neural network(s), and/or the like. For an example of determining the perception zone, the system may determine a possible path(s) that the ego-vehicle may navigate in order to try and collide with the object (e.g., determine a path(s) for each interaction that may cause a collision between the ego-machine and the object). For instance, if the object is located along a direction of travel of the ego-machine, then the ego-machine may continue along the current path and/or change paths based on the steering radius of the ego-machine. This is because the ego-machine may still collide with the object using any of these paths since the object may continue along the object's current path towards the ego-machine and/or change paths to avoid the collision with the ego-machine. As such, by turning the ego-machine based on the steering radius, the ego-machine may still collide with the object even if the object attempts to navigate away from the ego-machine.

The system may also determine a distance(s) for the path(s) of the ego-machine. To determine the distance(s), the system may use the time period for the ego-machine to begin decelerating, the deceleration of the ego-machine, the velocity of the object, the acceleration of the object, and/or one or more other parameters. For instance, the system may assume that the ego-machine will attempt to immediately stop once the object is detected. As such, a distance of a path may be determined based at least on the current velocity of the ego-machine, the time period for the ego-machine to begin decelerating, and the deceleration of the ego-machine. The system may then use similar processes to determine a respective distance for each of the one or more paths. Additionally, the system may use the determined path(s), along with the distance(s) for the path(s), to determine the perception zone for the object. For example, the perception zone may include a region within the environment that includes one or more (e.g., all) of the possible paths that the ego-machine may navigate while attempting to collide with the object.

The perception zones may be modeled in this way—e.g., by simulating the worst-case scenarios using unrealistic assumptions (e.g., a flat ground assumption, absence of any intervening objects between the object and the ego-machine, ego-machine and object accelerate at one another as fast as possible, etc.)— in order to ensure that the perception zones account for all objects that, even if a real-world environment were to match these unrealistic assumptions used to model the simulation, the perception zone of the ego-machine would still account for these objects. In this way, the perception zone of the ego-machine may be robust to not only more likely real-world scenarios, but also to corner cases that are less likely to occur naturally in the real-world.

The system may then use the perception zone for performing various processes. For a first example, such as when the system is determining the performance of the perception system of the ego-machine, the system may use the perception zone to determine whether a detection error associated with the object is a safety-critical error. For instance, and as discussed above, when testing the perception system, the perception system may detect an object (which may be referred to as a "ghost object") that is not located within the environment. As such, it is important to determine whether this detection error is safety-critical to the ego-machine. To determine whether the detection error is safety-critical, the system may determine whether the object is located within the perception zone. If the system determines that the object is located within the perception zone, then the system may determine that the detection error is a safety-critical error (e.g., a safety violation)—e.g., because a potential collision could occur before the ego-machine is able to come to a stop and/or an unintended deceleration associated with the vehicle because of the object. However, if the system determines that the object is located outside of the perception zone, then the system may determine that the detection error is not a safety-critical error—e.g., because there is no potential collision between the ego-machine and the object before the ego-machine is able to stop.

For a second example, such as when the system is deployed in an ego-machine that is navigating around a real-world environment, the system may use the perception zone to determine whether a detected object is a safety-critical object. For instance, while navigating, the ego-machine may detect the object using the perception system. The system may then perform the processes described herein to determine the perception zone for the object. Additionally, the system may determine whether the object is located within the perception zone. If the system determines that the object is located within the perception zone, then the system may determine that the object is a safety-critical object— e.g., that the object should be accounted for in making planning and/or control decisions. However, if the system determines that the object is located outside of the perception zone, then the system may determine that the object is not a safety-critical object—e.g., that the object may be ignored at least with respect to collision or obstacle avoidance, but may still be accounted for in planning and/or control decisions.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, real-time streaming, generating or presenting virtual reality (VR) content, generating or presenting augmented reality (AR) content, generating or presenting mixed reality (MR) content, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems for performing real-time streaming, systems for generating VR, AR, or MR content, systems for presenting VR, AR, or MR content, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

FIG. 1 illustrates an example data flow diagram for a process 100 of determining a perception zone for an object and then using the perception zone to determine whether the object is safety-critical, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 900 of FIGS. 9A-9D, example computing device 1000 of FIG. 10, and/or example data center 1100 of FIG. 11.

In some examples, the process 100 may be performed by one or more systems of an ego-machine. For example, and as discussed herein, the process 100 may be performed by the ego-machine during normal operation to determine whether an object(s) located within an environment is a safety-critical object(s). In some examples, the process 100 may be performed by one or more systems associated with a simulation and/or verification system. For example, the process 100 may be performed by a verification system in order to determine the performance of a perception system of the ego-machine. Both of these scenarios are described in more detail with respect to the output from an object-analysis component 102 of FIG. 1.

The process 100 may include a parameter detector 104 of the object-analysis component 102 that determines one or more parameters 106 associated with the ego-machine and/ or one or more parameters 106 associated with an object. In some examples, the parameter detector 104 may determine a parameter(s) 108 (also referred to as a "detected parameter(s) 108) associated with the ego-machine and/or a parameter(s) 108 associated with the object(s) using sensor data 110. In embodiments where the sensor data 110 includes image data, the image data may include data representative of images depicting one or more fields of view of one or more cameras (e.g., image sensors) of ego-machine, such as stereo camera(s), wide-view camera(s) (e.g., fisheye cameras), infrared camera(s), surround camera(s) (e.g., 360 degree cameras), long-range and/or mid-range camera(s), and/or other camera type of the autonomous vehicle. In some examples, the image data may be captured in one format (e.g., RCCB, RCCC, RBGC, etc.), and then converted (e.g., during pre-processing of the image data) to another format. In some other examples, the image data may be provided as input to a sensor data pre-processor (not shown) to generate pre-processed image data (discussed herein). Many types of images or formats may be used as inputs; for example, compressed images such as in Joint Photographic Experts Group (JPEG), Red Green Blue (RGB), or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor.

In some examples, before processing the sensor data 110, a sensor data pre-processor may use image data representative of one or more images (or other data representations) and load the sensor data 110 into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor. This ordering may be chosen to maximize training and/or inference performance of the parameter detector 104.

In some embodiments, a pre-processing image pipeline may be employed by the sensor data pre-processor to process a raw image(s) acquired by a sensor(s) (e.g., image sensor(s)) and included in the image data to produce pre-processed image data which may represent an input image(s) to the input layer(s) of the parameter detector 104. An example of a suitable pre-processing image pipeline may use a raw RCCB Bayer (e.g., 1-channel) type of image from the sensor 102 and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the sensor data pre-processor, it may include bilateral denoising in the Bayer domain. Where demosaicing is employed by the sensor data pre-processor, it may include bilinear interpolation. Where histogram computing is employed by the sensor data pre-processor, it may involve computing a histogram for the C channel, and may be merged with the decompanding or noise reduction in some examples. Where adaptive global tone mapping is employed by the sensor data pre-processor, it may include performing an adaptive gamma-log transform. This may include calculating a histogram, getting a mid-tone level, and/or estimating a maximum luminance with the mid-tone level.

As described herein, the parameter(s) 106 for the object may include, but is not limited to, a type (e.g., a vehicle, a pedestrian, a scooter, etc.) of the object, a location of the object, a velocity of the object (e.g., a current velocity, a maximum velocity, etc.), an acceleration of the object, a deceleration of the object, a size of the object, a direction of travel of the object, steering limits (e.g., a turning radius) for the object, and/or any other parameter 106. Additionally, as described herein, the parameter(s) 106 for the ego-machine may include, but is not limited to, a location of the ego-machine, a velocity of the ego-machine (e.g., a current velocity), a deceleration of the ego-machine, a time period for the ego-machine to begin decelerating, a size of the ego-machine, a front-rear axle distance of the ego-machine, a direction of travel of the ego-machine, steering limits (e.g., a turning radius) for the ego-machine, and/or any other parameter 106.

The process 100 may also include the parameter detector 104 receiving and/or generating a parameter(s) 112 (also referred to as a "pre-programmed parameter(s) 112") associated with the ego-machine and/or a parameter(s) 112 associated with the object. For instance, the parameters 112 for the object may include the acceleration of the object, the deceleration of the object, the maximum velocity of the object, and/or any other of the parameters 106. For example, the parameters 112 may indicate that the deceleration for the object is $-4.5$ ms$^{-2}$, the acceleration for the object is 4.5 ms$^{-2}$, and the maximum velocity for the object is 20 ms$^{-1}$, although other decelerations, accelerations, and/or maximum velocities may be used. In some examples, the parameter(s) 112 for the object may be based on the type of object. For example, the parameters 112 may include a first acceleration and/or a first maximum velocity for vehicles and a second acceleration and/or a second maximum velocity for pedestrians.

Additionally, with regard to the ego-machine, the parameter(s) 112 may include the deceleration of the ego-machine, the time period for the ego-machine to begin decelerating, the steering limits of the ego-machine, the size of the ego-machine, and/or the front-rear axle distance of the ego-machine. For example, the parameter(s) 112 for the ego-machine may indicate that the deceleration is $-3.5$ ms$^{-2}$, the ego-machine steering limits is a range between $-10°$ and $10°$, the ego-machine size is 4.5 m×2.5 m, the front-rear axle distance is 3 m, and the time period for the ego-machine to begin decelerating is 0.5 seconds, although other decelerations, steering limits, ego-machine sizes, front-rear axle distances, and/or time periods for the ego-machine to begin decelerating may be used.

The process 100 may also include receiving and/or generating one or more assumptions 114 associated with the ego-machine and/or the object. For instance, and as described herein, in order to be conservative and maximize the safety of the ego-machine and/or the object, the object-analysis component 102 may use, in addition to the parameters 106, the assumption(s) 114 when determining a perception zone 116 for the object. For instance, in some examples, a first assumption 114 may indicate that the ego-machine and the object will actively attempt to steer toward one another. For example, based on this first assumption 114, the object-analysis component 102 may determine that the ego-machine will turn in a direction(s) toward the object and that the object may turn in a direction(s) toward the ego-machine while at the same time accelerating. In some examples, a second assumption 114 may indicate that no obstacles are located between the ego-machine and the object and/or that the ego-machine and the object are navigating along a flat road. This way, the ego-machine and the object are able to navigate directly at one another using the shortest path, which may increase the simulated probability of collision.

Figure 2A:
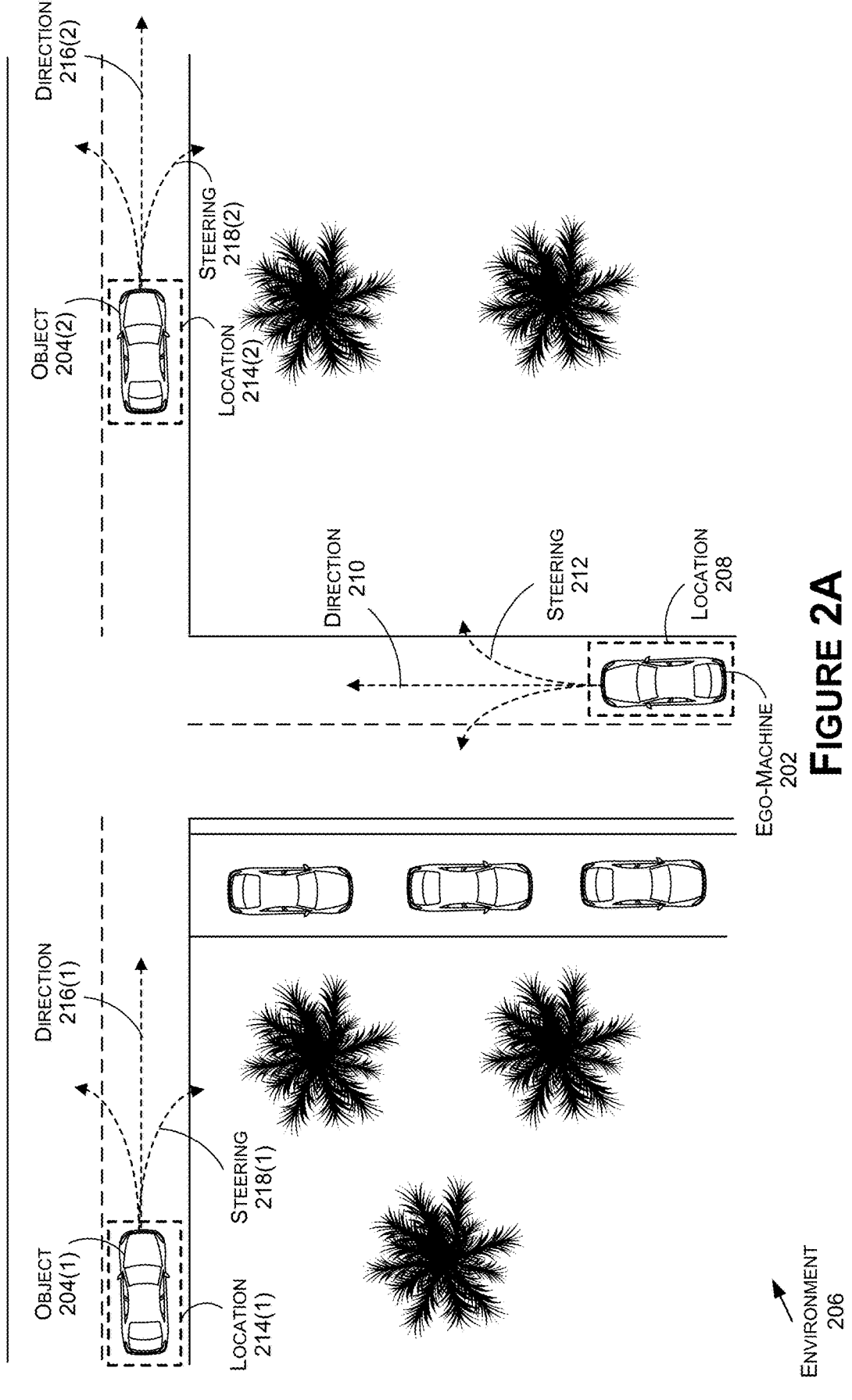
FIG. 2A illustrates an example of parameters associated with an ego-machine and objects located within an environment, in accordance with some embodiments of the present disclosure.

For instance, FIG. 2A illustrates an example of parameters 106 associated with an ego-machine 202 and objects 204 (1)-(2) (also referred to singularly as "object 204" or in plural as "objects 204") located within an environment 206, in accordance with some embodiments of the present disclosure. In the example of FIG. 2A, the environment 206 may include a real-world environment for which the ego-machine 202 is navigating or a simulated environment for which the ego-machine 202 is navigating. Additionally, while the example of FIG. 2A illustrates the objects 204 as including vehicles, in other examples, one or more of the objects 204 may include a different type of object (e.g., a person, a motorcycle, an animal, a building, a sign, etc.).

With reference to FIG. 1, a perception system 118 of the ego-machine 202 may analyze sensor data 110 to detect the objects 204 within the environment 206. In some examples, such as when the ego-machine 202 is navigating within a real-world environment, the perception system 118 may be included within and/or communicate with the object-analysis component 102. In other examples, such as when the ego-machine 202 is navigating within a simulated environment, the perception system 118 may be separate from the object-analysis component 102. For instance, in such examples, a system may be testing the perception system 118 in order to determine a performance of the perception system 118. In either of the examples, the perception system 118 may output data 120 associated with the objects 204. For example, and for an object 204, the data 120 may indicate a type of the object 204, a location of the object 204, and/or any other information associated with the object 204.

The parameter detector 104 may determine the parameters 106 associated with the ego-machine 202. The parameters 106 may include at least a location 208 of the ego-machine 202 (as indicated by the dashed lines), a velocity of the ego-machine 202 (e.g., a current velocity), a deceleration of the ego-machine 202, a time period for the ego-machine 202 to begin decelerating, a size of the ego-machine 202, front-rear axle distance of the ego-machine 202, a direction of travel 210 of the ego-machine 202, steering limits 212 (e.g., a turning radius) for the ego-machine 202, and/or any other parameter 106. As described herein, in some examples, one or more of the parameters 106 may include a detected parameter(s) 108 and/or one or more of the parameters 106 may include a pre-programmed parameter(s) 112.

The parameter detector 104 may also determine the parameters 106 associated with the object 204(1). The parameters 106 may include a type (e.g., a vehicle in the example of FIG. 2A) of the object 204(1), a location 214(1) of the object 204(1) (as indicated by the dashed lines), a velocity of the object 204(1) (e.g., a current velocity, a maximum velocity, etc.), an acceleration of the object 204 (1), a deceleration of the object 204(1), a size of the object 204(1), a direction of travel 216(1) of the object 204(1), steering limits 218(1) (e.g., a turning radius) for the object 204(1), and/or any other parameter 106. As described herein, in some examples, one or more of the parameters 106 may include a detected parameter(s) 108 and/or one or more of the parameters 106 may include a pre-programmed parameter(s) 112. Additionally, in some examples, one or more of the parameters 106 may be based on the type of the object 204(1).

The parameter detector 104 may also determine the parameters 106 associated with the object 204(2). The parameters 106 may include a type (e.g., a vehicle in the example of FIG. 2A) of the object 204(2), a location 214(2) of the object 204(2) (as indicated by the dashed lines), a velocity of the object 204(2) (e.g., a current velocity, a maximum velocity, etc.), an acceleration of the object 204 (2), a deceleration of the object 204(2), a size of the object 204(2), a direction of travel 216(2) of the object 204(2), steering limits 218(2) (e.g., a turning radius) for the object 204(2), and/or any other parameter 106. As described herein, in some examples, one or more of the parameters 106 may include a detected parameter(s) 108 and/or one or more of the parameters 106 may include a pre-programmed parameter(s) 112. Additionally, in some examples, one or more of the parameters 106 may be based on the type of the object 204(2).

Figure 2B:
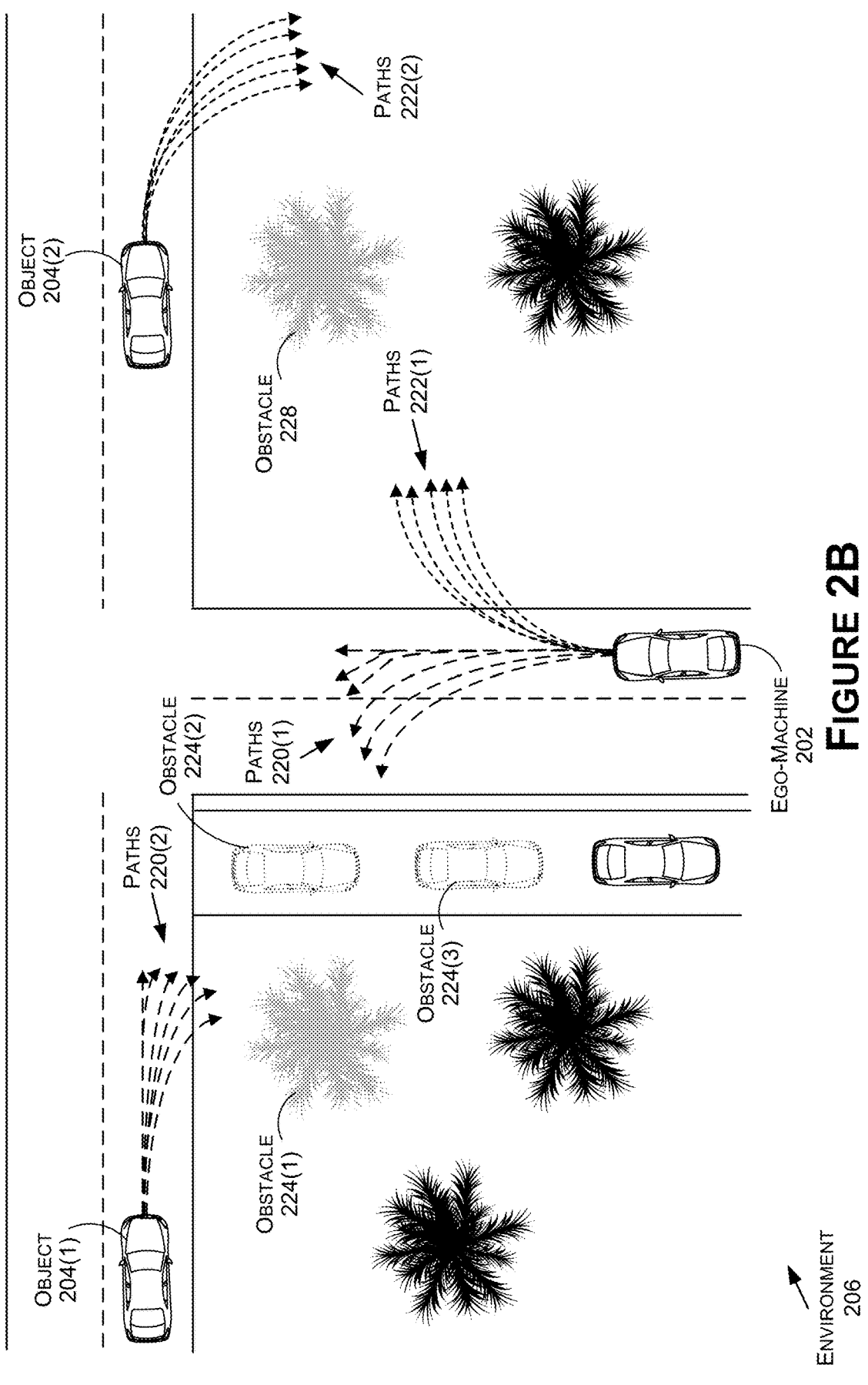
FIG. 2B illustrates an example of an assumption associated with the ego-machine and the objects from the example of FIG. 2A, in accordance with some embodiments of the present disclosure.

FIG. 2B illustrates an example of assumptions 114 associated with the ego-machine 202 and the objects 204 located within the environment 206, in accordance with some embodiments of the present disclosure. As described herein, in some examples, a first assumption 114 may indicate that the ego-machine 202 and the objects 204 will actively attempt to steer toward one another. As such, FIG. 2B illustrates that the ego-machine 202 may take paths 220(1) (which are represented by the large-dashed lines) and the object 204(1) may take paths 220(2) (which are also represented by the large-dashed lines) to actively attempt to steer toward one another. In some examples, the paths 220(1) are based on the location 208, the direction of travel 210, the steering limits 212, and/or the velocity of the ego-machine 202. Additionally, the paths 220(2) are based on the location 214(1), the driving direction 216(1), the steering limits 218(1), and/or the velocity of the object 204(1).

Additionally, FIG. 2B illustrates that the ego-machine 202 may take paths 222(1) (which are represented by the short-dashed lines) and the object 204(2) may take paths 222(2) (which are also represented by the short-dashed lines) to actively attempt to steer toward one another. In some examples, the paths 222(1) are based on the location 208, the direction of travel 210, the steering limits 212, and/or the velocity of the ego-machine 202. Additionally, the paths 222(2) are based on the location 214(2), the driving direction 216(2), the steering limits 218(2), and/or the velocity of the object 204(2).

As further described herein, a second assumption 114 may indicate that no obstacles are located between the ego-machine 202 and the objects 204 and/or that the ego-machine 202 and the object 204 are navigating along a flat road. As such, in the example of FIG. 2B, because of the second assumption 114, the ego-machine 202 may continue along the paths 220(1) and the object 204(1) may continue along the paths 220(2) as if obstacles 224(1)-(3) are not located within the environment 206, which is illustrated by the light shading of the obstacle 224(1) and the dotted lines of the obstacles 224(2)-(3). Additionally, because of the second assumption 114, the ego-machine 202 may continue along the paths 222(1) and the object 204(2) may continue along the paths 222(2) as if an obstacle 226 is not located within the environment 206, which is illustrated by the light shading of the obstacle 226. As described herein, the assumptions 114 may be used in order to be conservative and maximize the safety of the ego-machine 202 and/or the object 204.

Referring back to FIG. 1, a zone generator 122 of the object-analysis component 102 may use at least the parameters 106 and the assumption(s) 114 to determine a perception zone(s) 116 for an object(s) within the environment. In some examples, the zone generator 122 determines the perception zone(s) 116 using one or more reachability techniques, such as Hamilton-Jacobi (HJ) reachability. For an example of determining a perception zone 116, and for the object 204(1) of FIGS. 2A-2B, the zone generator 122 may determine the possible paths 220(1) that the ego-machine 202 may navigate in order to try and steer toward the object 204(1). As described herein, since the zone generator 122 may use one or more possible interactions (e.g., all possible interactions) between the ego-machine 202 and the object 204(1), the zone generator 122 may determine the paths 220(1) of the ego-machine 202 based on the paths 220(2) of the object 204(2).

For instance, and as shown by the example of FIG. 2B, the paths 220(1) of the ego-machine 202 may include a first path 220(1) where the ego-machine 202 continues along a straight path (e.g., along the direction of travel 210), a second path 220(1) where the ego-machine 202 turns left according to the maximum steering limit 212 of the ego-machine 202, and multiple other paths 220(1) that are between the first path 220(1) and the second path 220(1). This is because the paths 220(2) of the object 204(1) include a first path 220(2) where the object 204(1) continues along a straight path (e.g., along the direction of travel 216(1)), a second path 220(2) where the object 204(1) turns right according to the maximum steering limit 218(1) of the object 204(1), and multiple other paths 220(2) that are between the first path 220(2) and the second path 220(2). As such, the ego-machine 202 is able to steer toward the object 204(1) (and thus simulate an intent to collide with the object 204(1)) when taking one or more (e.g., each of) the paths 220(1).

The zone generator 122 may also determine distances for the paths 220(1) of the ego-machine 202. To determine the distances, the zone generator 122 may use the time period for the ego-machine 202 to begin decelerating, the deceleration of the ego-machine 202, the velocity of the object 204(1), the acceleration of the object 204(1), and/or one or more additional parameters 106. For instance, the zone generator 122 may assume that the ego-machine 202 will attempt to immediately stop once the object 204(1) is detected. As such, a distance along a path 220(1) may be determined based at least on the current velocity of the ego-machine 202, the time period for the ego-machine 202 to begin decelerating, the deceleration of the ego-machine 202, the velocity of the object 204(1), and the acceleration of the object 204(1). The zone generator 122 may then use similar processes to determine a respective distance for one or more other paths 220(1) (e.g., each of the paths 220(1)).

Figure 3:
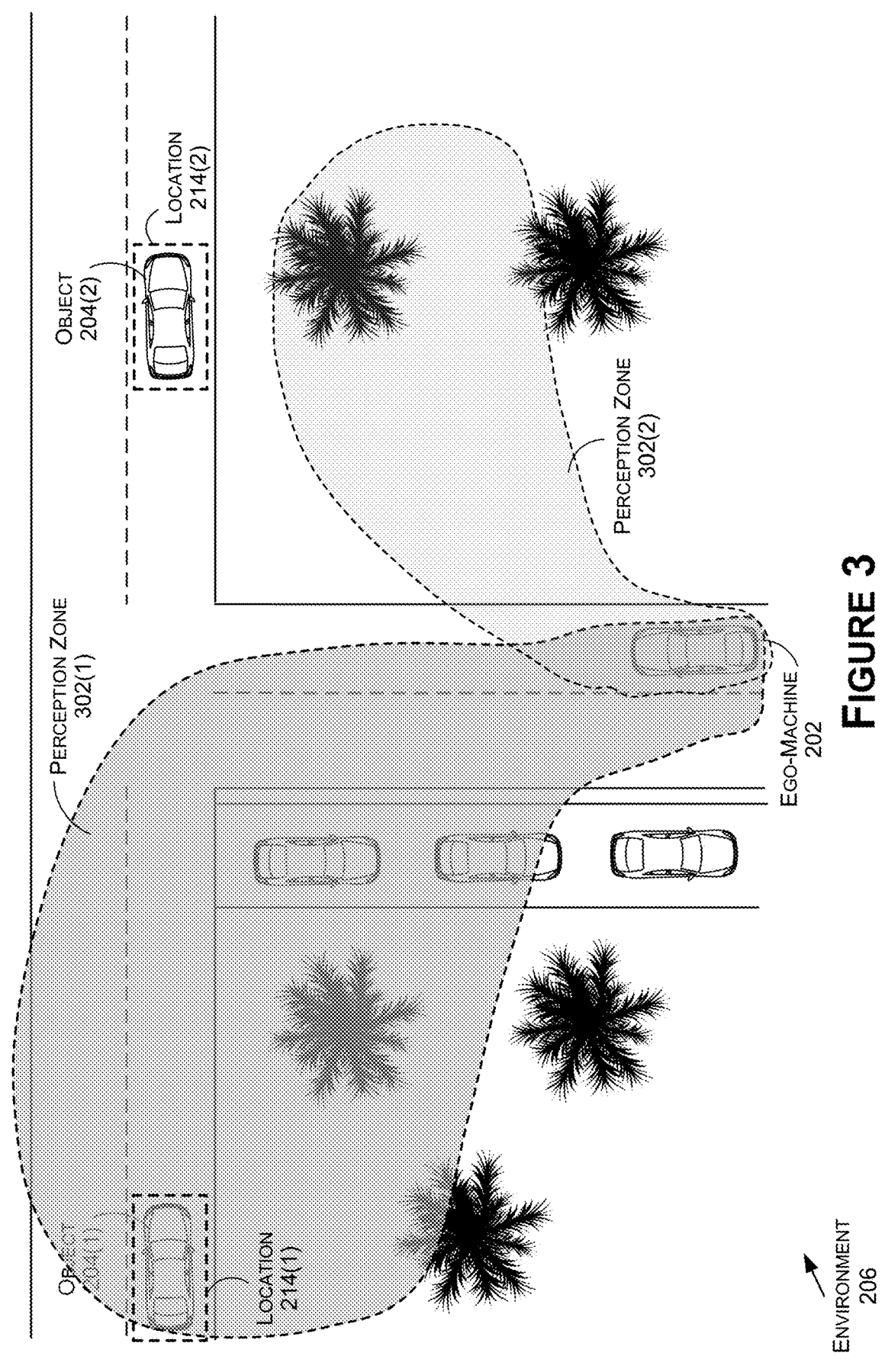
FIG. 3 illustrates an example of determining perception zones for objects and then using the perception zones to determine whether the objects are safety-critical objects, in accordance with some embodiments of the present disclosure.

The zone generator 122 may use one or more of the determined paths 220(1), along with the distance(s) for the determined path(s) 220(1), to determine the perception zone 116 for the object 204(1). For instance, FIG. 3 illustrates an example of perception zones 302(1)-(2) (also referred to singularly as "perception zone 302" or in plural as "perception zones 302") for the objects 204, in accordance with some embodiments of the present disclosure. As shown, the perception zone 302(1) (which may represent, and/or include, one of the perception zone(s) 116) may include a region within the environment 206 that includes one or more of the paths 220(1) (e.g., all of the paths 220(1)) that the ego-machine 202 may navigate while attempting to collide with the object 204(1).

The zone generator 122 may also determine distances for the paths 222(1) of the ego-machine 202. To determine the distances, the zone generator 122 may use the time period for the ego-machine 202 to begin decelerating, the deceleration of the ego-machine 202, the velocity of the object 204(2), the acceleration of the object 204(2), and/or one or more additional parameters 106. For instance, the zone generator 122 may assume that the ego-machine 202 will attempt to immediately stop (e.g., taking into account a delay in performing the actuation) once the object 204(2) is detected. As such, a distance along a path 222(1) may be determined based at least on the current velocity of the ego-machine 202, the time period for the ego-machine 202 to begin decelerating, the deceleration of the ego-machine 202, the velocity of the object 204(2), and the acceleration of the object 204(2). The zone generator 122 may then use similar processes to determine a respective distance for one or more other paths 222(1) (e.g., each of the paths 222(1)).

The zone generator 122 may use one or more of the determined paths 222(1), along with the distance(s) for the determined path(s) 222(1), to determine the perception zone 302(2) (which may represent, and/or include, one of the perception zone(s) 116) for the object 204(2). For instance, and as shown, the perception zone 302(2) may include a region within the environment 206 that includes one or more of the paths 222(1) (e.g., all of the paths 222(1)) that the ego-machine 202 may navigate while attempting to collide with the object 204(2). While the example of FIG. 3 illustrates the zone generator 122 as determining the perception zones 302 for the objects 204, in other examples, the zone generator 122 may determine one or more additional perception zones 116 for one or more other objects located within the environment 206.

While the examples above describe the zone generator 122 as generating the perception zones using one or more reachability techniques, in other examples, the zone generator 122 may generate the perception zones using one or more additional and/or alternative techniques. For instance, the zone generator 122 may generate the perception zones using a dynamic programming and/or partial differential equation technique(s) (e.g., the one or more reachability techniques, one or more reinforcement learning techniques, etc.), a data-driven technique(s) (e.g., using one or more neural networks, which are described in more detail with regard to FIGS. 8A-8B), a sampling-based technique(s) (e.g., one or more Monte-Carlo Simulations, etc.), a geometric reachable set approximation technique(s) (e.g., one or more Zonotopes, etc.), and/or any other technique.

Referring back to FIG. 1, the process 100 may include a zone analyzer 124 of the object-analysis component 102 determining whether an object(s) associated with a perception zone(s) 116 is a safety-critical object(s). In some examples, the zone analyzer 124 may determine that an object is a safety-critical object based on the object being located within the perception zone 116 and determine that the object is not a safety-critical based on the object being located outside of the perception zone 116. In such examples, the zone analyzer 124 uses such a technique based on an assumption 114 that the ego-machine is not at fault for a simulated collision at a time that the ego-machine stops.

For instance, and referring back to FIG. 3, the zone analyzer 124 may determine that the current location 214(1) of the object 204(1) is within the perception zone 302(1). As such, the zone analyzer 124 may determine that the object 204(1) is a safety-critical object. This is because, in the simulation, a collision is possible between the ego-machine 202 and the object 204(1), e.g., before the ego-machine 202 is able to stop. The zone analyzer 124 may also determine that the current location 214(2) of the object 204(2) is outside of the perception zone 302(2). As such, the zone analyzer 124 may determine that the object 204(2) is not a safety-critical object—e.g., because there is no possibility of collision between the ego-machine 202 and the object 204 (2) before the ego-machine 202 is able to stop.

Figure 4:
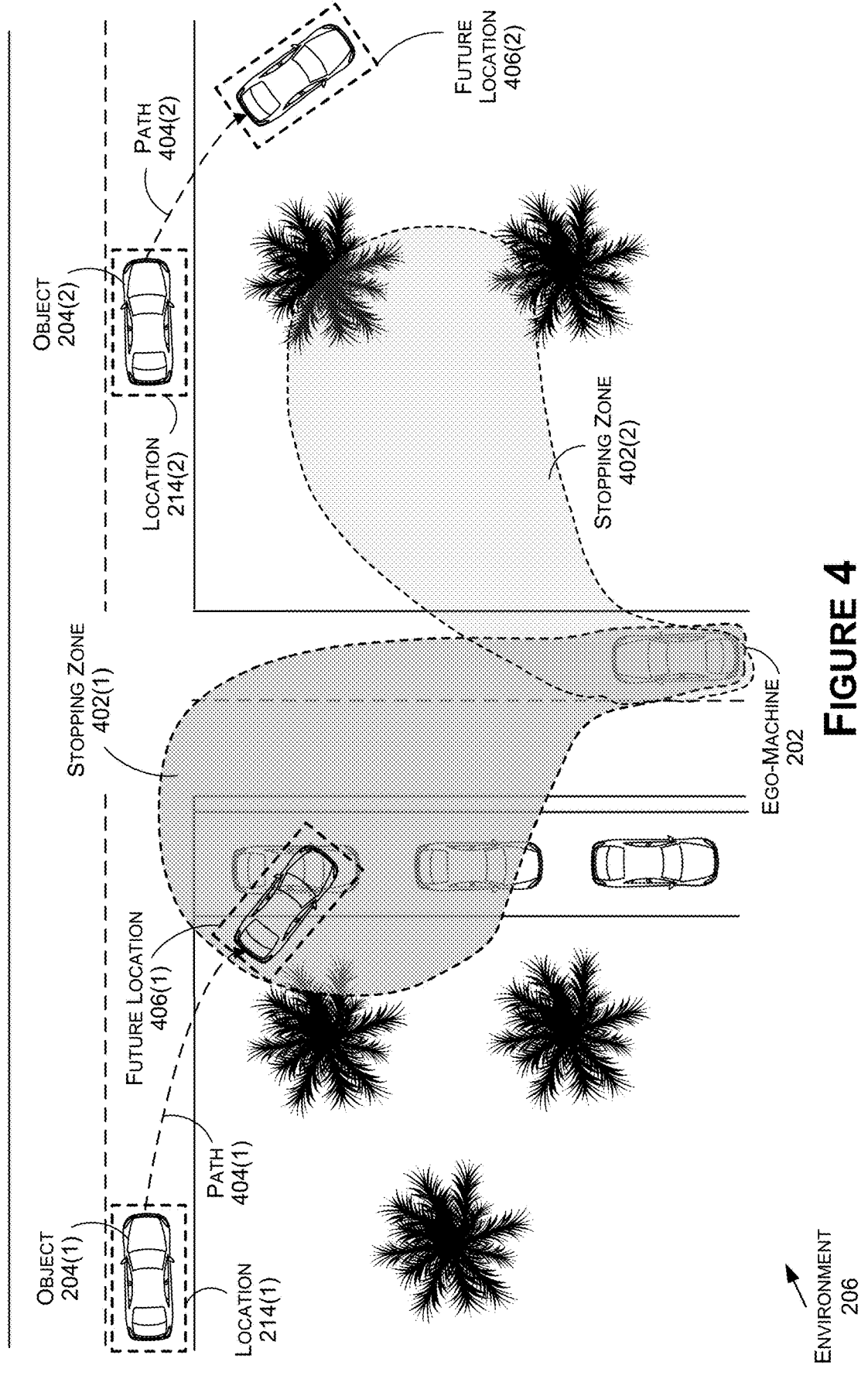
FIG. 4 illustrates an example of an ego-machine and objects simulating a collision with one another before the ego-machine is able to come to a stop, in accordance with some embodiments of the present disclosure.

As another illustration of using reachability to determine whether the objects 204 are safety-critical objects, FIG. 4 illustrates an example of the ego-machine 202 and the objects 204 attempting to steer toward one another while the ego-machine 202 is attempting to stop, in accordance with examples of the present disclosure. As shown, FIG. 4 illustrates a stopping zone 402(1) associated with the object 204(1) and a stopping zone 402(2) associated with the object 204(2). In some examples, the stopping zones 402(1) represents the region that the ego-machine 202 will travel along the paths 220(1) and the stopping zone 402(2) represents the region that the ego-machine 202 will travel along the path 222(1) based on the velocity of the ego-machine 202, the deceleration of the ego-machine 202, and the time period for the ego-machine 202 to begin decelerating.

As shown, there is a possibility of collision between the ego-machine 202 and the object 204(1) before the time that the ego-machine 202 stops. This is based on a possible path 404(1) (which may represent, and/or include, one of the paths 220(2)) of the object 204(1). As shown, based on the possible path 404(1), a future location 406(1) of the object 204(1) at a time before the ego-machine 202 stops is within the stopping zone 402(1). As such, within this simulation, there is a possibility of collision between the ego-machine 202 and the object 204(1) while the ego-machine 202 is stopping.

As also shown, there is no probability of collision between the ego-machine 202 and the object 204(2) before the time that the ego-machine 202 stops. This is based on a possible path 404(2) (which may represent, and/or include, one of the paths 222(2)) of the object 204(2). As shown, based on the possible path 404(2), a future location 406(2) of the object 204(2) at a time that the ego-machine 202 stops is outside of the stopping zone 402(2). As such, there is no possibility of collision between the ego-machine 202 and the object 204(2) while the ego-machine 202 is stopping.

As described herein, the object-analysis component 102 may use reachability, such as HJ reachability, to determine a perception zone(s) 116 and/or whether an object(s) is a safety-critical object(s). For example, the object-analysis component 102 may set target states L which the ego-machine and an object will seek or avoid within a time horizon T. For example, L may correspond to the set of joint system states where the ego-machine E and the object C are in collision. The output of the reachability computation is then a set of initial states (termed the backwards reachable tube (BRT)) where membership denotes that it is possible for a simulated collision between the ego-machine E and the object C at some point in the future while following their respective optimal control policies.

In some examples, when calculating the perception zone(s) 116, the object-analysis component 102 may not consider an adversarial setting where the ego-machine E is trying to avoid the object C while subject to the worst-case (e.g., collision-seeking) actions of the object C. Instead, the object-analysis component 102 may make an even more conservative assumption that the ego-machine E may be in a situation where the ego-machine's E preferred actions are to steer toward the object C (e.g., similar to the assumption(s) 114). With join dynamics $\dot{z}=f(z, u_E, u_C)$, where $z \in Z \in \mathbb{R}^n$ denotes the joint state of the ego-machine E and the object C, and $u_E$ and $u_C$ are the controls of the ego-machine E and the object C, respectively, the object-analysis component 102 then defines:

$$S(t) := \{ \bar{z} \in Z | \exists u_E(\cdot), \exists u_C(\cdot), \exists s \in [t,0], z(t) = \bar{z} \wedge \dot{z} = f(z, u_E, u_C) \wedge z(s) \in L \} \quad (1)$$

In other words, S(t) denotes a set of joint initial states where there exists a policy $u_E(\cdot)$ and $u_C(\cdot)$ where the ego-machine E and the object C may enter L (e.g., collide if L represents collision states) within a time horizon |t| in the future. The set S(t) may be computed as the zero sublevel set of a value function V(z, t) which may obey a Hamilton-Jacobi-Bellman partial differential equation (PDE):

$$\frac{\partial V(z, t)}{\partial t} + \min\{0, H(z, t)\} = 0, \; V(z, 0) = \ell(z), \quad (2)$$

$$H(z, t) = \min_{u_E \in U^E} \min_{u_C \in U^C} \nabla_Z V(z, t)^T f(z, u_E, u_c)$$

The boundary condition for this PDE is defined by the function $\ell : Z \rightarrow \mathbb{R}$ whose zero sublevel set encodes L. Additionally, equation (2) accounts for closed-loop control policies of both the ego-machine E and the object C because at any point in time and at any state, equation (2) considers $u_E$ and $u_C$ that minimizes the value function.

By solving equation (2) backwards in time over a time horizon of T, the object-analysis component 102 may obtain the value function V(z, t) for $t \in [-T, 0]$. For a starting state (e.g., any starting state), $z \in Z$, V(s, t) corresponds to the lowest value of $\ell(\cdot)$ along a system trajectory within |t| seconds if both the ego-machine E and the object C act optimally, by the following equation:

$$u_E^*, u_C^* = \text{argmin}_{u_E \in U^E} \text{argmin}_{u_C \in U^C} c \nabla_Z V(z, t)^T f(z, u_E, u_c) \quad (3)$$

Thus, the set states from which collision may be reached within |t| seconds is determined by the following equation:

$$S(t) = \{ z | V(z, t) < 0 \} \quad (4)$$

The object-analysis component 102 may numerically solve the PDE and store the value function over a n-dimensional grid in state space where $z \in Z \in \mathbb{R}^n$.

In some examples, by approaching the perception zone 116 problem using reachability, the object-analysis component 102 may compute the set of joint states S(t) where membership of the set indicates that the entry into L (e.g., the safety requirement is violated) is possible within |t| seconds when considering a set of possible closed-loop control policies that the ego-machine E and the object C may take.

In some examples, the one or more of the elements (e.g., the parameters) of equation (2) may be updated to reflect one or more of the assumption(s) 114. For example, the object-analysis component 102 may modify the information pattern and/or if the ego-machine E and the object C are minimizers or maximizers. For instance, as discussed herein, the object-analysis component 102 considers the minimum and maximum formulation (e.g., the ego-machine E and the object C are attempting to collide) while another approach may include assuming that the ego-machine E is collision-avoiding which corresponds to the minimum and maximum formulation.

Additionally, the discussion above described that the control sets ($U^E$ and $U^C$) represent one or more (e.g., all) dynamic feasible controls of the ego-machine E and the object C. However, the object-analysis component 102 may restrict the control set to reflect assumptions about how the ego-machine E and/or the object C may behave in safety-critical scenarios. Furthermore, the object-analysis component 102 may define $\ell(\cdot)$ as long as its zero sublevel set equals L. However, the object-analysis component 102 may design or learn alternative functions that capture more nuanced notations for safety. For example, by shaping $\ell$ to penalize more dangerous orientations (e.g., a T-bone collision), the object-analysis component 102 may encode collision severity or collision responsibility.

In some examples, the object-analysis component 102 may select a dynamics model for the ego-machine E. A higher fidelity model may better represent the true system, but may also make reachability computation quickly intractable based on the dimensionality. As such, the object-analysis component 102 may relax the perception zone soundness requirement while maintaining completeness. Essentially, the object-analysis component 102 may elect to use a lower fidelity dynamics model (e.g., ignore higher order derivatives such as jerk and steering rate) to keep the reachability computation tractable at the cost of being slightly over conservative.

In some examples, the dynamics model considered may depend on the type of obstacle detected (e.g., a vehicle, a pedestrian, a motorcycle, etc.). The object-analysis component 102 may assume that the ego-machine E and the object C will obey the dynamically extended simple model described by the following:

$$\dot{w} = \begin{bmatrix} \dot{x} \\ \dot{y} \\ \dot{\varphi} \\ \dot{v} \end{bmatrix} = \begin{bmatrix} v\cos\varphi \\ v\sin\varphi \\ \dfrac{v}{d}\tan\delta \\ a \end{bmatrix}, \quad \begin{array}{l} w = [x, y, \varphi.v]^T \\ u = [\delta, a]^T \\ 0 \le v \le v_{max} \\ v_{min} \le u \le v_{max} \end{array} \qquad (5)$$

In equation (5), (x. y) is the position of the center of the rear axle in a fixed world frame, $\varphi$ is the heading angle, $v$ is the velocity, $\delta$ is the steering input, $a$ is the acceleration input, and $d$ is the distance between the front axle and real axle. Because of this, the object-analysis component 102 may define the relative state of $z=[x_R, y_R, \varphi_R, v_E, v_C]$ and associated dynamics as:

$$\dot{z} = \begin{bmatrix} v_C\cos\varphi_R - v_E + \dfrac{v_R v_E}{d_E}\tan\delta_E \\ v_C\sin\varphi_R - \dfrac{x_R v_E}{d_E}\tan\delta_E \\ a_E \\ a_C \end{bmatrix}, \quad \begin{array}{l} \begin{bmatrix} x_R \\ y_R \end{bmatrix} = R_{\varphi_E}\begin{bmatrix} x_C - x_E \\ y_C - y_E \end{bmatrix}, \\[2mm] R_\varphi = \begin{bmatrix} \cos\varphi\sin\varphi \\ -\sin\varphi\cos\varphi \end{bmatrix}, \\[2mm] \varphi_R = \varphi_C - \varphi_E \end{array} \qquad (6)$$

The object-analysis component 102 may then use the relative dynamics from equation (6) to solve the PDE.

In some examples, the terminal value function $\ell(\cdot)$ may be designed to reflect different safety requirements such as front or rear end collisions within a pre-specified velocity range. For simplicity, the object-analysis component 102 may consider any type of collision at any velocity as unsafe. Therefore, the object-analysis component 102 may define $\ell(\cdot):=\ell_{SD}(\cdot)$ to describe the signed distance between the ego-machine E and the object C as two rectangular rigid objects.

As described herein, in some examples, the object-analysis component 102 may assume that the ego-machine E will perform a hard braking maneuver and come to a complete stop. For instance, the object-analysis component 102 may use a reaction time $\Delta t_{react}$ before the ego-machine E starts to brake at a fixed deceleration $a_{brake}$. The reaction time allows for any possible latency that the ego-machine E may experience before the braking is initiated. To compute the reachability function according to those two phases, noting that the reachability function is computed backward in time, the object-analysis component 102 may compute the braking phase $V_{brake}(z, t)$ by using $\ell_{SD}(\cdot)$ as the terminal value function. Then, for the reaction phase, the object-analysis component 102 may set $$\ell_{react}(z)=V_{brake}(z,-t_{stop}{}^E(z))$$

as the terminal value function where $$t_{stop}^E(z = [x_R, y_R, \varphi_R, v_E, v_c]) = \frac{v_E}{|a_{brake}|}$$

is the time taken for the ego-machine E to come to a complete stop when applying constant deceleration $a_{brake}$. In some examples, since the object-analysis component 102 may consider the stopping time in the braking phase, and the reaction time is over a fixed time interval, the object-analysis component 102 may simply consider the last time slice from the resulting value function.

In some examples, such as when a lower fidelity model is used as compared to a higher fidelity model with higher-order integrator states (e.g., jerk, steering rate, etc.), the object-analysis component 102 may be more conservative in the perception zone 116 computation. As such, completeness may still be preservice with a relaxed soundness requirement. For instance, extended dynamics may include:

$$z_{ext} = f_{ext}\left(z_{ext} = \begin{bmatrix} z \\ u_E \\ u_C \\ \dot{u}_A \\ \dot{u}_B \\ \cdot \\ \cdot \\ \cdot \\ \dfrac{d^{i-1}u_E}{dt^{i-1}} \\ \dfrac{d^{j-1}u_E}{dt^{j-1}} \end{bmatrix}, \dfrac{d^i u_E}{dt^i}, \dfrac{d^j u_C}{dt^j}\right) = \begin{bmatrix} f(z, u_E, u_C) \\ \dot{u}_A \\ \dot{u}_B \\ \dot{u}_A \\ \dot{u}_B \\ \cdot \\ \cdot \\ \cdot \\ \dfrac{d^i u_E}{dt^i} \\ \dfrac{d^j u_E}{dt^j} \end{bmatrix} \qquad (7)$$

In equation (7), integrators may be added to the controls to reflect realistic slew rates (as opposed to instantaneous changes) in acceleration, steering, and/or one or more other controls. The perception zone $S_{ext}$ corresponding to the extended dynamics is a subset of S, the perception zone corresponding to the lower fidelity dynamics f. As such, the completeness may still be preserved by computing with the lower fidelity dynamics. In some examples, if there are controls $$\frac{d^i u_E}{dt^i}(\cdot), \frac{d^j u_E}{dt^j}(\cdot)$$

in the higher fidelity dynamics that lead to collision, then the object-analysis component 102 may consider the corresponding lower fidelity controls $u_E(\cdot)$, $u_C(\cdot)$ integrated from the higher fidelity controls as an existence of proof for membership for S. In other words, ignoring slew-rates may increase the control authority of the ego-machine E and the object C that are seeking collision with one another.

In some examples, the object-analysis component 102 may generate more than one perception zone 116 for more than one object within the environment. In such examples, the object-analysis component 102 may still consider the ego-machine E with each object C pairwise in order to preserve the completeness. For instance, given a safety-critical joint state $z_{multi} \in S_{multi}$ (e.g., there exist joint controls such that at least one contender K collides with the ego-machine E) the object-analysis component 102 may still consider the restriction of the joint controls for the ego-machine E and the contender K. This multi-agent configuration may still be regarded as safety-critical for the (E,K) pair, such that the object-analysis component 102 may still be sufficiently considering the safety-critical detection(s) (e.g., each false detection) individually.

In some examples, the perception zone(s) 116 may correspond to a region(s) within position space where the reachability value is negative. The stopping rate of the ego-vehicle E may be determined by the following:

$$r_{stop}(v_E) = v_E \Delta t_{react} + \frac{v_E^2}{2|a_{brake}|} + \sqrt{L^2 + R^2} \qquad (8)$$

In equation (8), $r_{stop}$ is the stopping distance for the ego-machine, $a_{brake}$ is the deceleration of the ego-machine, $\Delta t_{react}$ is the reaction time for the ego-machine to begin decelerating, L is the length of the ego-machine, and W is the width of the ego-machine.

Referring back to FIG. 1, the object-analysis component 102 may generate data 126 indicating whether an object(s) is a safety-critical object( ) For example, and using the example of FIG. 3, the data 126 may indicate that the object 204(1) is a safety-critical object and that the object 204(2) is not a safety-critical object. In some examples, one or more systems may then perform one or more processes based on the data 126.

For instance, in some examples, if a system is performing a verification test on the perception system 118 of the ego-machine, then the system may determine whether an error(s) from the perception system 118 is a safety-critical error(s) or not a safety-critical error(s). For a first example, if the perception system 118 detects an object that is not located within an environment (e.g., detects a "ghost object"), then the system may determine that the error is a safety-critical error when the data 126 indicates that the object is a safety-critical object or determine that the error is not a safety-critical error when the data 126 indicates that the object is not a safety-critical object. For a second example, if the perception system 118 does not detect an object that is located within an environment, then the system may again determine that the error is a safety-critical error when the data 126 indicates that the object is a safety-critical object or determine that the error is not a safety-critical error when the data 126 indicates that the object is not a safety-critical object.

In some examples, the system may be executing on the ego-machine while the ego-machine is navigating in the real-world. In such examples, the ego-machine may perform one or more operations based on the data 126 output from the object-analysis component 102. For a first example, if the data 126 indicates that a detected object is a safety-critical object, then one or more other systems of the ego-machine may use data associated with the object when determining an operation(s) for the ego-machine to perform. For a second example, if the data 126 indicates that a detected object is not a safety-critical object, then the one or more other systems of the ego-machine may not use data associated with the object when determining an operation(s) for the ego-machine to perform.

As further illustrated in the example of FIG. 1, in some examples, the process 100 may include the object-analysis component 102 generating a lookup table(s) 128—either online or offline (e.g., prior to deployment). In such examples, the lookup table(s) 128 may indicate the parameters 106 that caused objects to include safety-critical objects and/or the parameters 106 that caused objects to not include safety-critical objects. This way, the ego-machine may later use the lookup table(s) 128 to determine whether an object in the real-world is a safety-critical object without performing the full analysis using the object-analysis component 102. For example, when the ego-machine detects an object, the ego-machine may determine the parameters 106 associated with the object and the parameters associated with the ego-machine. The ego-machine may then compare the determined parameters of the ego-machine and/or the object to the stored parameters within the lookup table(s) 128 in order to identify a match between the determined parameters and the stored parameters (and/or a substantial match, such as when the determined parameters are within one or more thresholds to the stored parameters). Based on the match (and/or the substantial match), the ego-machine may then use the lookup table(s) 128 to determine whether the object is a safety-critical object This way, the ego-machine is able to quickly determine whether objects within the environment are safety-critical objects or non-safety-critical objects. As such, by modeling the perception zones using a conservative approach (e.g., ego-machine and/or object steer toward one another, flat ground, no other objects between ego-machine the object, etc.), the object classifications of safety-critical or not safety-critical determined using the perception zones may help to ensure that the ego-machine accounts for any and all objects that may affect the planning and control of the ego-machine.

Figure 5A:
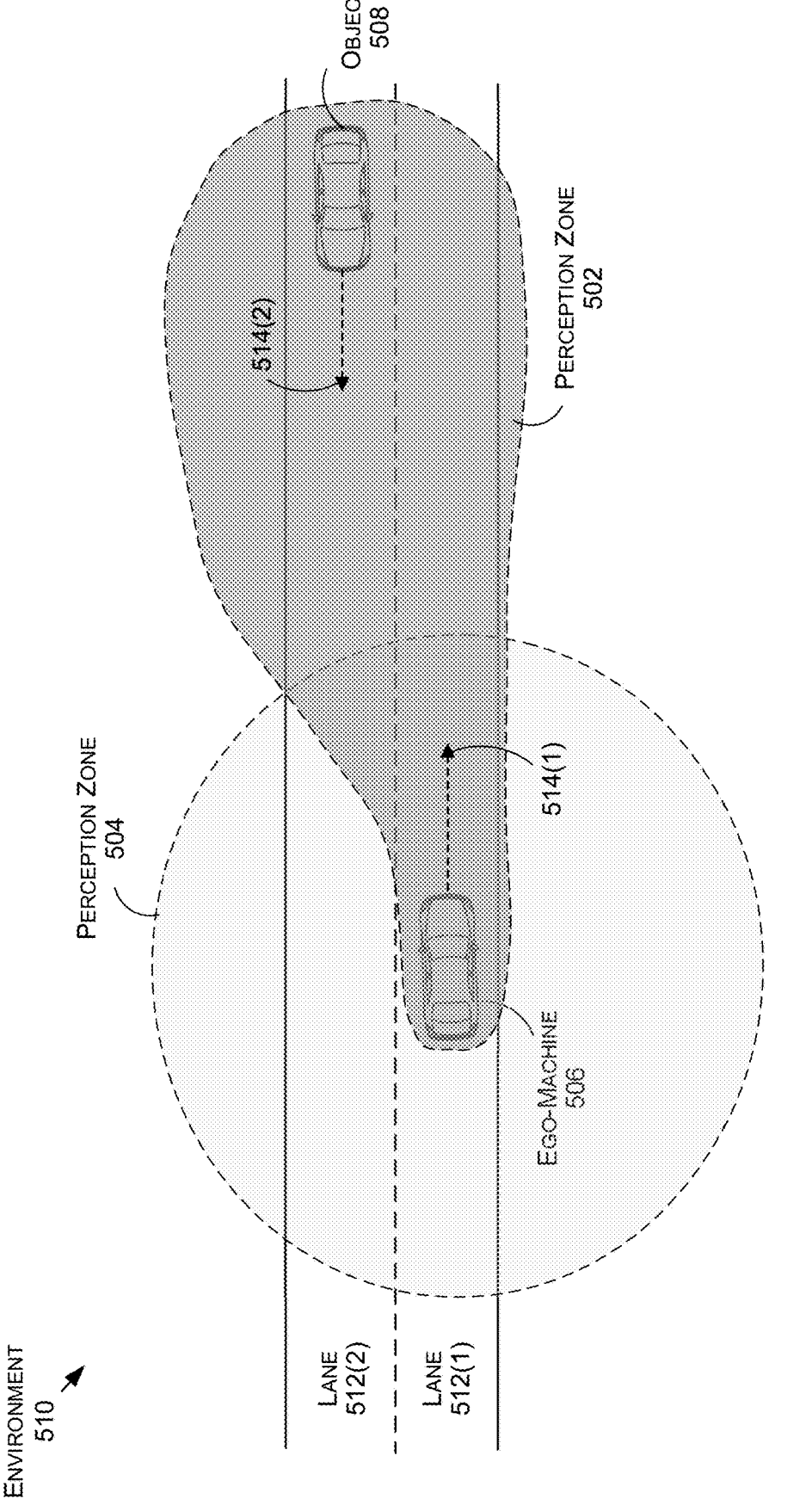
FIGS. 5A-5B illustrate examples of determining whether objects are safety-critical using a reachability technique(s) and a circular baseline technique(s), in accordance with examples of the present disclosure.

As described herein, the systems may provide improvement over conventional systems by better determining when objects are safety-critical objects and when objects are not safety-critical objects. As such, FIG. 5A illustrates a first example comparison between a reachability perception zone 502 (which may represent, and/or include, one of the perception zone(s) 116) and a circular baseline perception zone 504, in accordance with some embodiment of the present disclosure. As shown, an ego-machine 506 may detect an object 508 within an environment 510 (e.g., a real-world environment, a simulated environment, etc.). In the example of FIG. 5A, the ego-machine 506 may be navigating along a first lane 512(1), as represented by an arrow 514(1), and the object 508 may be navigating along a second lane 512(2), as represented by an arrow 514(2). The ego-machine 506 and/or the object-analysis component 102 may then determine whether the object 508 is safety-critical. As shown, using the circular baseline technique, the ego-machine 506 and/or another conventional system may determine that the object 508 is not safety-critical since the object 508 is located outside of the circular baseline perception zone 502. However, using the reachability technique described herein, the ego-machine 506 and/or the object-analysis component 102 may determine that the object 508 is safety-critical since the object 508 is located within the reachability perception zone 502.

In some examples, the circular baseline technique may determine that the object 508 is not safety-critical since the object 508 is located a far distance from the ego-machine 506 (e.g., a distance that is greater than a radius of the circular baseline perception zone 504 circle). However, since the reachability technique described herein uses dynamic models for the ego-machine 506 and the object 508, as well as one or more possible interactions (e.g., all possible interactions) between the ego-machine 506 and the object 508, the reachability technique may use the velocity of the object 508 when determining the reachability perception zone 504. As such, even though the object 508 is located a far distance from the ego-machine 506, the object 508 may still be safety-critical since the object 508 is moving at a high velocity towards the ego-machine 506.

Figure 5B:
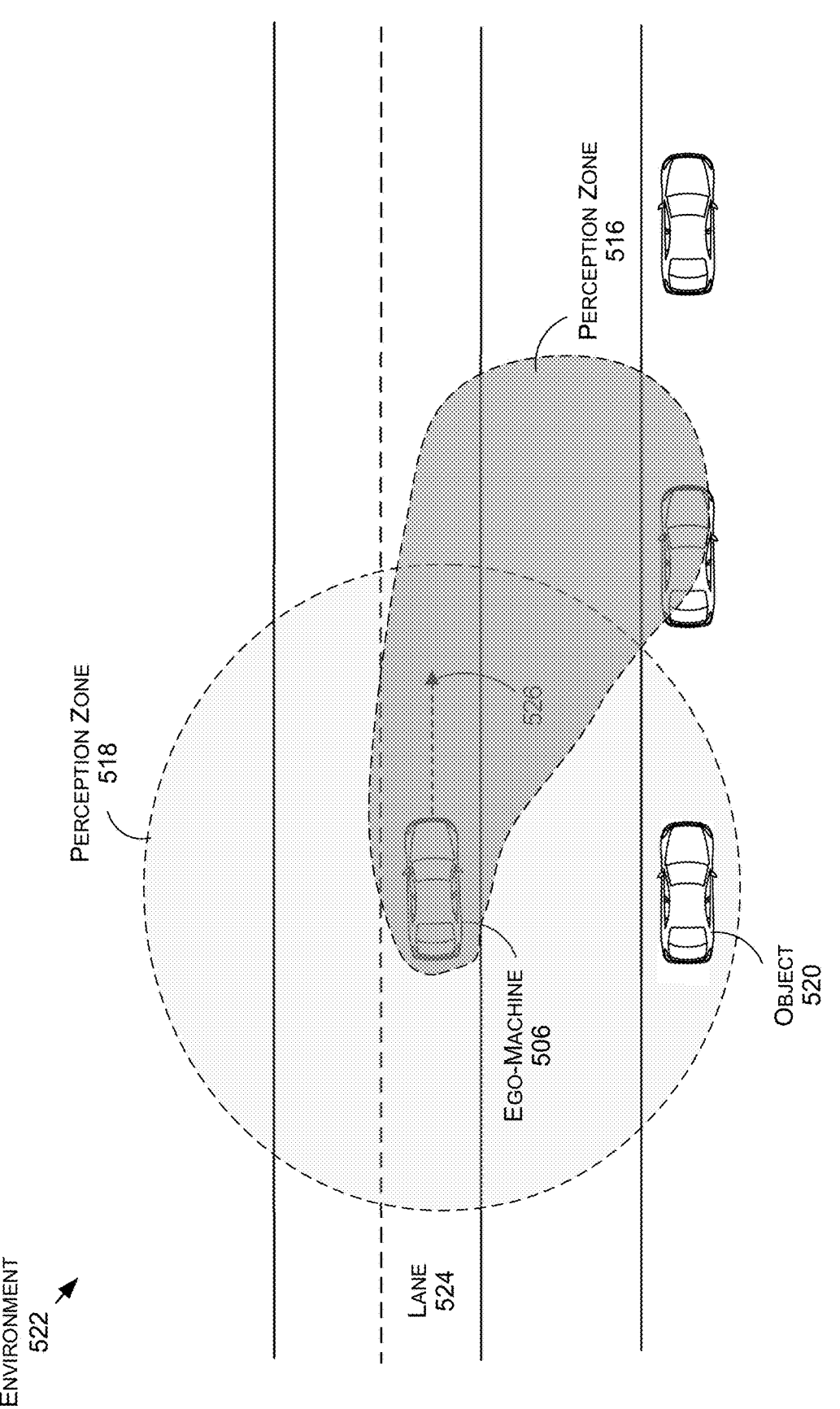

FIG. 5B illustrates a second example comparison between a reachability perception zone 516 (which may represent, and/or include, one of the perception zone(s) 116) and a circular baseline perception zone 518, in accordance with some embodiment of the present disclosure. As shown, the ego-machine 506 may detect an object 520 within an environment 522 (e.g., a real-world environment, a simulated environment, etc.). In the example of FIG. 5B, the ego-machine 506 may be navigating along lane 524, as represented by an arrow 526, and the object 520 may be parked on another road. The ego-machine 506 and/or the object-analysis component 102 may then determine whether the object 520 is safety-critical. As shown, using the circular baseline technique, the ego-machine 506 and/or another conventional system may determine that the object 520 is safety-critical since the object 520 is located within the circular baseline perception zone 518. However, using the reachability technique described herein, the ego-machine 506 and/or the object-analysis component 102 may determine that the object 520 is not safety-critical since the object 520 is located outside of the reachability perception zone 516.

In some examples, the circular baseline technique may determine that the object 520 is safety-critical since the object 520 is located near the ego-machine 506 (e.g., a distance that is within a radius of the circular baseline perception zone 518 circle). However, since the reachability technique described herein uses dynamic models for the ego-machine 506 and the object 520, as well as one or more possible interactions (e.g., all possible interactions) between the ego-machine 506 and the object 520, the reachability technique may use the velocity of the object 520 when determining the reachability perception zone 516. As such, even though the object 520 is located near the ego-machine 506, the object 520 may still not be safety-critical since object 520 is directed away from the ego-machine 506 and the object 520 is stopped.

Figure 6:
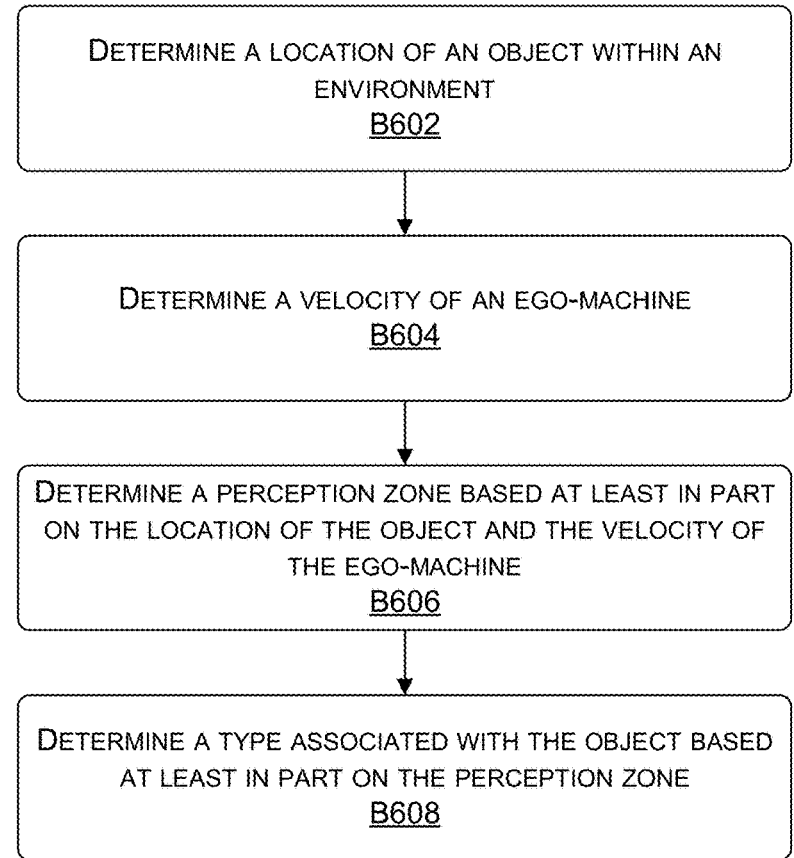
FIG. 6 is a flow diagram showing a method for determining a perception zone and then using the perception zone to determine whether an object is a safety-critical object, in accordance with some embodiments of the present disclosure.

Now referring to FIGS. 6 and 7, each block of methods 600 and 700, described herein, comprises a computing process that may be performed using any combination of hardware, firmware, and/or software. For instance, various functions may be carried out by a processor executing instructions stored in memory. The methods 600 and 700 may also be embodied as computer-usable instructions stored on computer storage media. The methods 600 and 700 may be provided by a standalone application, a service or hosted service (standalone or in combination with another hosted service), or a plug-in to another product, to name a few. In addition, methods 600 and 700 are described, by way of example, with respect to FIG. 1. However, these methods 600 and 700 may additionally or alternatively be executed by any one system, or any combination of systems, including, but not limited to, those described herein.

FIG. 6 is a flow diagram showing a method 600 for determining a perception zone and then using the perception zone to determine whether an object is a safety-critical object, in accordance with some embodiments of the present disclosure. The method 600, at block B602, may include determining a location of an object within an environment. For instance, the ego-machine may be navigating within an environment, such as a real-world environment or a virtual environment. While navigating, the ego-machine may use one or more sensors to generate sensor data 110. The object-analysis component 102 may then analyze the sensor data 110 to determine the location of the object (or may use information available from a simulation system to determine the location of the object). In some examples, the object-analysis component 102 may determine an additional parameter(s) 106 associated with the object. As described herein, the parameter(s) 106 for the object may include, but are not limited to, a type (e.g., a vehicle, a pedestrian, a scooter, etc.) of the object, a location of the object, a velocity of the object (e.g., a current velocity, a maximum velocity, etc.), an acceleration of the object, a deceleration of the object, a size of the object, a direction of travel of the object, steering limits (e.g., a turning radius) for the object, and/or any other parameter 106.

The method 600, at block B604, may include determining a velocity of an ego-machine. For instance, the object-analysis component 102 may determine the velocity associated with the ego-machine. In some examples, the object-analysis component 102 may determine an additional parameter(s) 106 associated with the ego-machine. As described herein, the parameter(s) 106 for the ego-machine may include, but are not limited to, a location of the ego-machine, a velocity of the ego-machine (e.g., a current velocity), a deceleration of the ego-machine, a time period for the ego-machine to begin decelerating, a size of the ego-machine, a front-rear axle distance of the ego-machine, a direction of travel of the ego-machine, steering limits (e.g., a turning radius) for the ego-machine, and/or any other parameter 106.

The method 600, at block B606, may include determining a perception zone based at least in part on the location of the object and the velocity of the ego-machine. For instance, the object-analysis component 102 may determine the perception zone 116 associated with the object using the location of the object and the velocity of the ego-machine. In some examples, the object-analysis component 102 may determine the perception zone 116 using an additional parameter(s) 106 associated with the ego-machine and/or an additional parameter(s) 106 associated with the object. Additionally, in some examples, the object-analysis component 102 may determine the perception zone 116 using one or more assumptions 114.

The method 600, at block B608, may include determining a type associated with the object based at least in part on the perception zone. For instance, the object-analysis component 10 may determine whether the object is a first type of object, such as a safety-critical object, or a second type of object, such as a non-safety-critical object, based on the perception zone 116. As described herein, the object-analysis component 102 may determine that the object is the first type of object when the object is located within the perception zone 116 and determine that the object is the second type of object when the object is located outside of the perception zone 116.

FIG. 7 is a flow diagram showing a method 700 for determining a perception zone associated with an object, in accordance with some embodiments of the present disclosure. The method 700, at block B702, may include determining one or more first parameters associated with an ego-machine. For instance, the object-analysis component 102 may determine the parameter(s) 106 associated with the ego-machine. As described herein, the parameter(s) 106 for the ego-machine may include, but are not limited to, a location of the ego-machine, a velocity of the ego-machine (e.g., a current velocity), a deceleration of the ego-machine, a time period for the ego-machine to begin decelerating, a size of the ego-machine, a front-rear axle distance of the ego-machine, a direction of travel of the ego-machine, steering limits (e.g., a turning radius) for the ego-machine, and/or any other parameter 106. In some examples, the parameter(s) 106 may include a detected parameter(s) 108. In some examples, the parameter(s) 106 may include a pre-programmed parameter(s) 112.

The method 700, at block B704, may include determining one or more second parameters associated with an object. For instance, the object-analysis component 102 may determine the parameter(s) 106 associated with the object. As described herein, the parameter(s) 106 for the object may include, but are not limited to, a type (e.g., a vehicle, a pedestrian, a scooter, etc.) of the object, a location of the object, a velocity of the object (e.g., a current velocity, a maximum velocity, etc.), an acceleration of the object, a deceleration of the object, a size of the object, a direction of travel of the object, steering limits (e.g., a turning radius) for the object, and/or any other parameter 106. In some examples, the parameter(s) 106 may include a detected parameter(s) 108. In some examples, the parameter(s) 106 may include a pre-programmed parameter(s) 112.

The method 700, at block B706, may include determining one or more possible interactions between the ego-machine and the object. For instance, the object-analysis component 102 may determine the interaction(s) between the ego-machine and the object. In some examples, the object-analysis component 102 determines the interaction(s) using an assumption(s) 114. For example, the object-analysis component 102 may determine the interaction(s) based on the assumption 114 that the ego-machine and the object will actively attempt to steer toward one another. Additionally, in some examples, the object-analysis component 102 may determine the interaction(s) based on the assumption 114 that no other obstacles are located between the ego-machine and the object. As such, based on the assumption(s) 114, the interaction(s) may be associated with the ego-machine and the object taking one or more paths in order to steer toward one another.

The method 700, at block B708, may include determining a perception zone associated with the object based at least in part on the one or more first parameters, the one or more second parameters, and the one or more possible interactions. For instance, the object-analysis component 102 may determine the perception zone 116 using the parameters(s) 106 for the ego-machine, the parameter(s) 106 for the object, and the possible interaction(s). In some examples, the object-analysis component 102 may then use the perception zone 116 to determine whether the object is a type of object, such as a safety-critical object, using one or more of the processes described herein. In some examples, the object-analysis component 102 may use the perception zone 116 to determine whether a perception error associated with the object is a safety-critical error, using one or more of the processes described herein.

The method 700, at block B710, may include evaluating perception information corresponding to the object in view of the perception information. For instance, the object-analysis component 102 may evaluate the perception information (e.g., the location of the object, the type of the object, etc.) with respect to the perception zone.

The method 700, at block B712, may include determining whether an error is present in the perception information. For instance, the object-analysis component 102 may determine whether there is an error in the perception information. In some examples, the object-analysis component 102 may determine that there is the error when the location of the object is within the perception zone 116. Additionally, the object-analysis component 102 may determine that there is not the error when the location of the object is outside of the perception zone 116

Figure 8A:
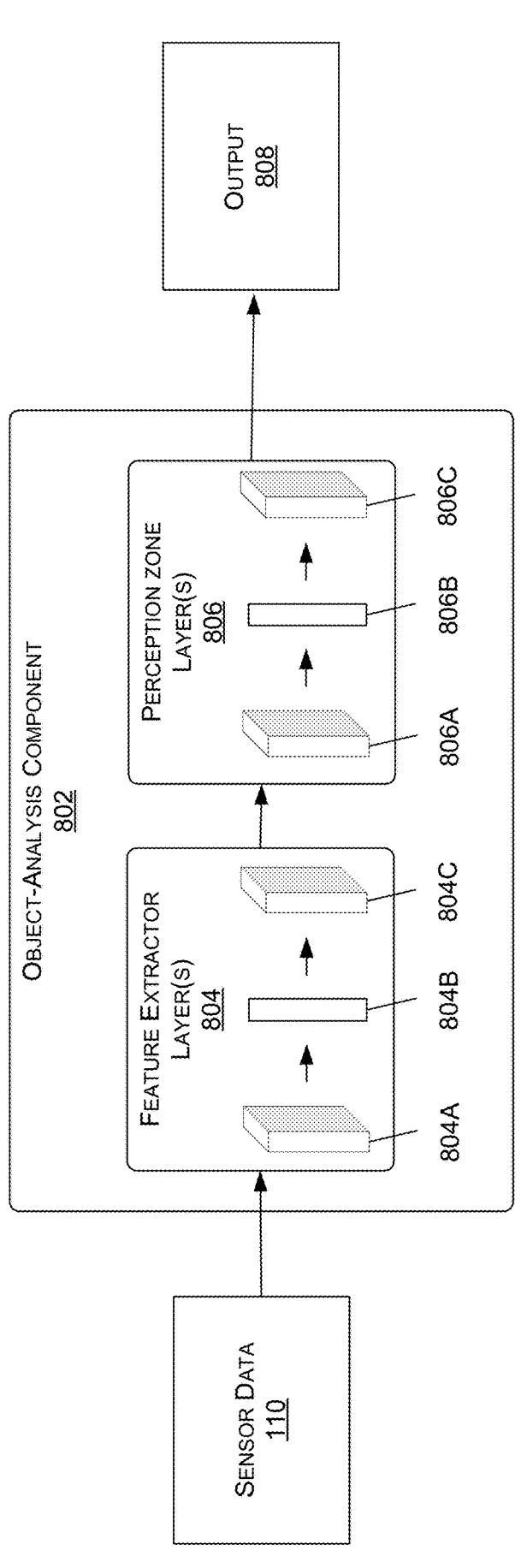
FIG. 8A illustrates an example object-analysis component for processing sensor data in order to determine and use a perception zone(s), in accordance with some embodiments of the present disclosure.

As described herein, in some examples, the object-analysis component 102 may include a neural network(s) that is configured to determine a perception zone(s), determine a type of object, and/or determine whether an error is a safety-critical error. As such, FIG. 8A is an illustration of an example object-analysis component 802 (which may represent, and/or include, the object-analysis component 102), in accordance with some embodiments of the present disclosure. The object-analysis component 802 may be one example of a machine learning model that may be used to perform one or more of the processes described herein. The object-analysis component 802 may include one or more neural networks, such as convolutional neural networks (alternatively referred to herein as convolutional neural network 802, convolutional network 802, or CNN 802).

As described herein, the object-analysis component 802 may use the sensor data 110 (with or without pre-processing) as an input. The sensor data 110 may represent images generated by one or more cameras, depth data generated by one or more depth sensors, RADAR data, LIDAR data, and/or any other type of sensor data. More specifically, the sensor data 110 may include individual images generated by the camera(s), where image data representative of one or more of the individual images may be input into the object-analysis component 802 at each iteration of the object-analysis component 802. The sensor data 110 may be input as a single image, or may be input using batching, such as mini-batching. For example, two or more images may be used as inputs together (e.g., at the same time). The two or more images may be from two or more sensors that captured the images at the same time. In addition to sensor data 110, other data may also be provided as input to the DNN(s), such as parameter information corresponding to the parameters described herein (e.g., velocity, acceleration, etc., corresponding to the objects and/or the ego-machine).

The sensor data 110 (and/or other data) may be input into a feature extractor layer(s) 804 of the object-analysis component 802. The feature extractor layer(s) 804 may include any number of layers 804, such as the layers 804A-804C. One or more of the layers 804 may include an input layer. The input layer may hold values associated with the sensor data 110. For example, when the sensor data 110 is an image(s), the input layer may hold values representative of the raw pixel values of the image(s) as a volume (e.g., a width, W, a height, H, and color channels, C (e.g., RGB), such as 32.times.32.times.3), and/or a batch size, B (e.g., where batching is used).

One or more layers 804 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32.times.32.times.12, if 12 were the number of filters).

One or more of the layers 804 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 804 may include a pooling layer. The pooling layer may perform a down-sampling operation along the spatial dimensions (e.g., the height and the width), which may result in a smaller volume than the input of the pooling layer (e.g., 16.times.16.times.12 from the 32.times.32.times.12 input volume). In some examples, the object-analysis component 102 may not include any pooling layers. In such examples, other types of convolution layers may be used in place of pooling layers. In some examples, the feature extractor layer(s) 804 may include alternating convolutional layers and pooling layers.

One or more of the layers 804 may include a fully connected layer. Each neuron in the fully connected layer(s) may be connected to each of the neurons in the previous volume. The fully connected layer may compute class scores, and the resulting volume may be 1.times. 1.times.number of classes. In some examples, the feature extractor layer(s) 804 may include a fully connected layer, while in other examples, the fully connected layer of the object-analysis component 802 may be the fully connected layer separate from the feature extractor layer(s) 804. In some examples, no fully connected layers may be used by the feature extractor layer(s) 804 and/or the object-analysis component 802 as a whole, in an effort to increase processing times and reduce computing resource requirements. In such examples, where no fully connected layers are used, the object-analysis component 802 may be referred to as a fully convolutional network.

One or more of the layers 804 may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution of the input images (e.g., the sensor data 110) to the object-analysis component 802, or used to up-sample to the input spatial resolution of a next layer.

Although input layers, convolutional layers, pooling layers, ReLU layers, deconvolutional layers, and fully connected layers are discussed herein with respect to the feature extractor layer(s) 804, this is not intended to be limiting. For example, additional or alternative layers 804 may be used in the feature extractor layer(s) 804, such as normalization layers, SoftMax layers, and/or other layer types.

The output of the feature extractor layer(s) 804 may be an input to a perception zone layer(s) 806. The perception zone layer(s) 806A-C may use one or more of the layer types described herein with respect to the feature extractor layer(s) 804. As described herein, the perception zone layer(s) 806 may not include any fully connected layers, in some examples, to reduce processing speeds and decrease computing resource requirements. In such examples, the perception zone layers 806 may be referred to as fully convolutional layers.

Different orders and numbers of the layers 804 and 806 of the object-analysis component 802 may be used, depending on the embodiment. For example, where two or more cameras or other sensor types are used to generate inputs, there may be a different order and number of layers 804 and 806 for one or more of the sensors. As another example, different ordering and numbering of layers may be used depending on the type of sensor used to generate the sensor data 110, or the type of the sensor data 110 (e.g., RGB, YUV, etc.). In other words, the order and number of layers 804 and 806 of the object-analysis component 802 is not limited to any one architecture.

In addition, some of the layers 804 and 806 may include parameters (e.g., weights and/or biases)—such as the feature extractor layer(s) 804 and/or the perception zone layer(s) 806—while others may not, such as the ReLU layers and pooling layers, for example. In some examples, the parameters may be learned by the object-analysis component 802 during training. Further, some of the layers 804 and 806 may include additional hyper-parameters (e.g., learning rate, stride, epochs, kernel size, number of filters, type of pooling for pooling layers, etc.)— such as the convolutional layer(s), the deconvolutional layer(s), and the pooling layer(s)— while other layers may not, such as the ReLU layer(s). Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

In any example, output 808 of the object-analysis component 802 may include, and/or be similar to, the safety-critical data 126.

Figure 8B:
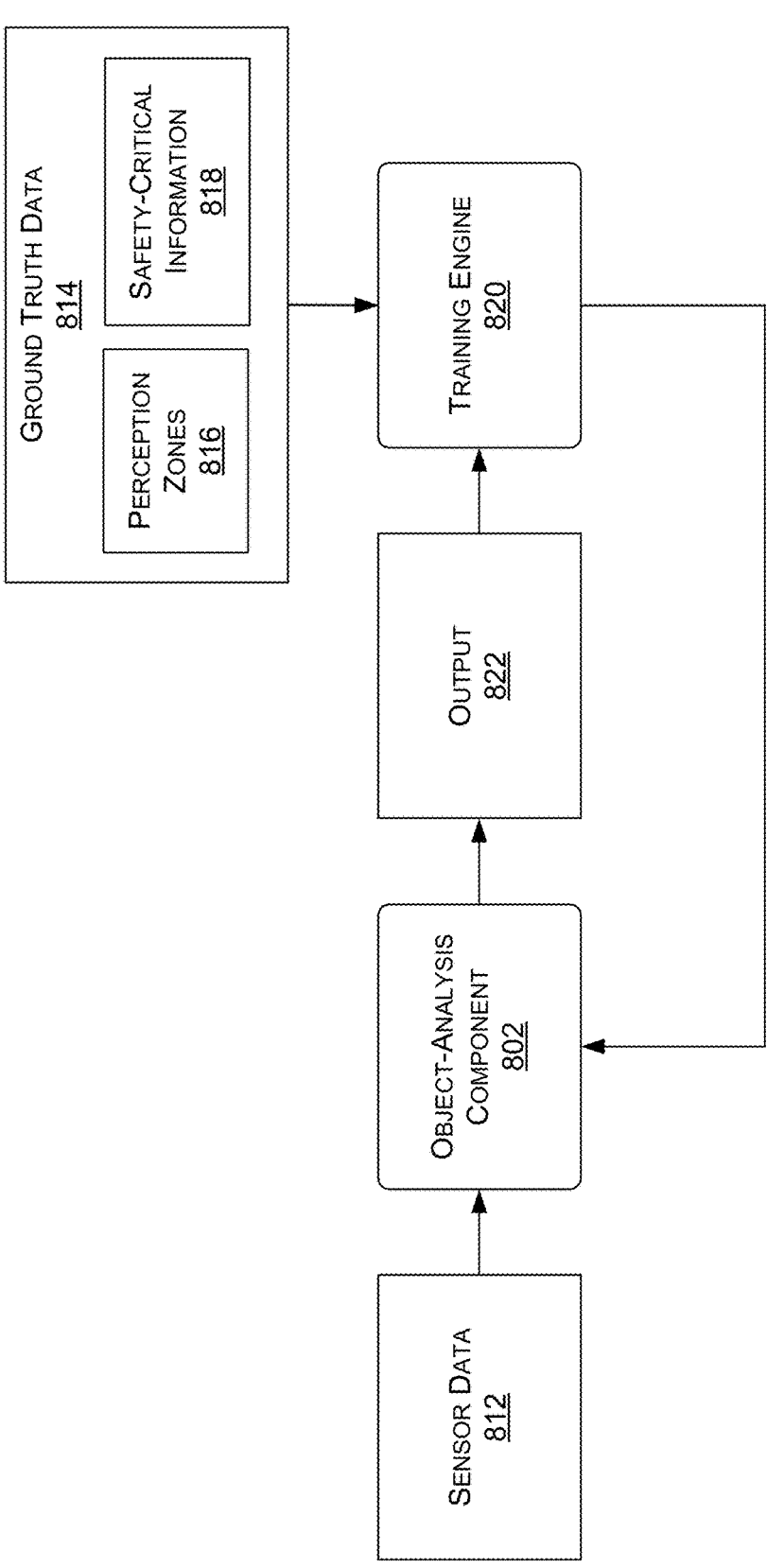
FIG. 8B is a data flow diagram illustrating a process for training an object-analysis component that is configured to determine and use a perception zone(s), in accordance with some embodiments of the present disclosure.

Now referring to FIG. 8B, FIG. 8B is a data flow diagram illustrating a process 810 for training the object-analysis component 802 for determining and using a perception zone(s), in accordance with some embodiments of the present disclosure. As shown, the object-analysis component 802 may be trained using sensor data 812 (e.g., training sensor data). The sensor data 812 used for training may include original images (e.g., as captured by one or more image sensors), down-sampled images, up-sampled images, cropped or region of interest (ROI) images, otherwise augmented images, and/or a combination thereof. The sensor data 812 may represent images or other sensor data representations (e.g., point clouds, projection images, etc.) captured by one or more sensors (e.g., cameras, depth sensors, etc.), and/or may be images and/or other sensor data representations captured from within a virtual environment used for testing and/or generating training sensor data (e.g., a virtual camera of a virtual machine within a virtual or simulated environment). In some examples, the sensor data 812 may represent images and/or other sensor data representations from a data store or repository of training sensor data (e.g., images of driving surfaces, RADAR data from an automatic teller machine (ATM), images from a surveillance system, etc.).

The object-analysis component 802 may be trained using the training sensor data 812 as well as corresponding ground truth data 814. The ground truth data 814 may include annotations, labels, masks, indicated perception zones, and/or the like. For example, in some embodiments, the ground truth data 814 may include perception zones 816 (e.g., indicating where perception zones are present in the particular sensor data instance) and/or safety-critical information 818 (e.g., mask, tablet, etc.). The ground truth data 814 may be generated within a drawing program (e.g., an annotation program), a computer aided design (CAD) program, a labeling program, another type of program suitable for generating the ground truth data 814, and/or may be hand drawn, in some examples. In any example, the ground truth data 814 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). In some examples, for each input image, there may be corresponding ground truth data 814.

A training engine 820 may use one or more loss functions that measure loss (e.g., error) in outputs 822 (which may represent, and/or include, the safety-critical data 126 and/or the output 808) as compared to the ground truth data 814. Any type of loss function may be used, such as cross entropy loss, mean squared error, mean absolute error, mean bias error, and/or other loss function types. In some embodiments, different outputs 822 may have different loss functions. For example, the perception zone outputs may have a first loss function and the safety-critical information may have a second loss function. In such examples, the loss functions may be combined to form a total loss, and the total loss may be used to train (e.g., update the parameters of) the object-analysis component 802. In any example, backward pass computations may be performed to recursively compute gradients of the loss function(s) with respect to training parameters. In some examples, weight and biases of the object-analysis component 802 may be used to compute these gradients.

Example Autonomous Vehicle

Figure 9A:
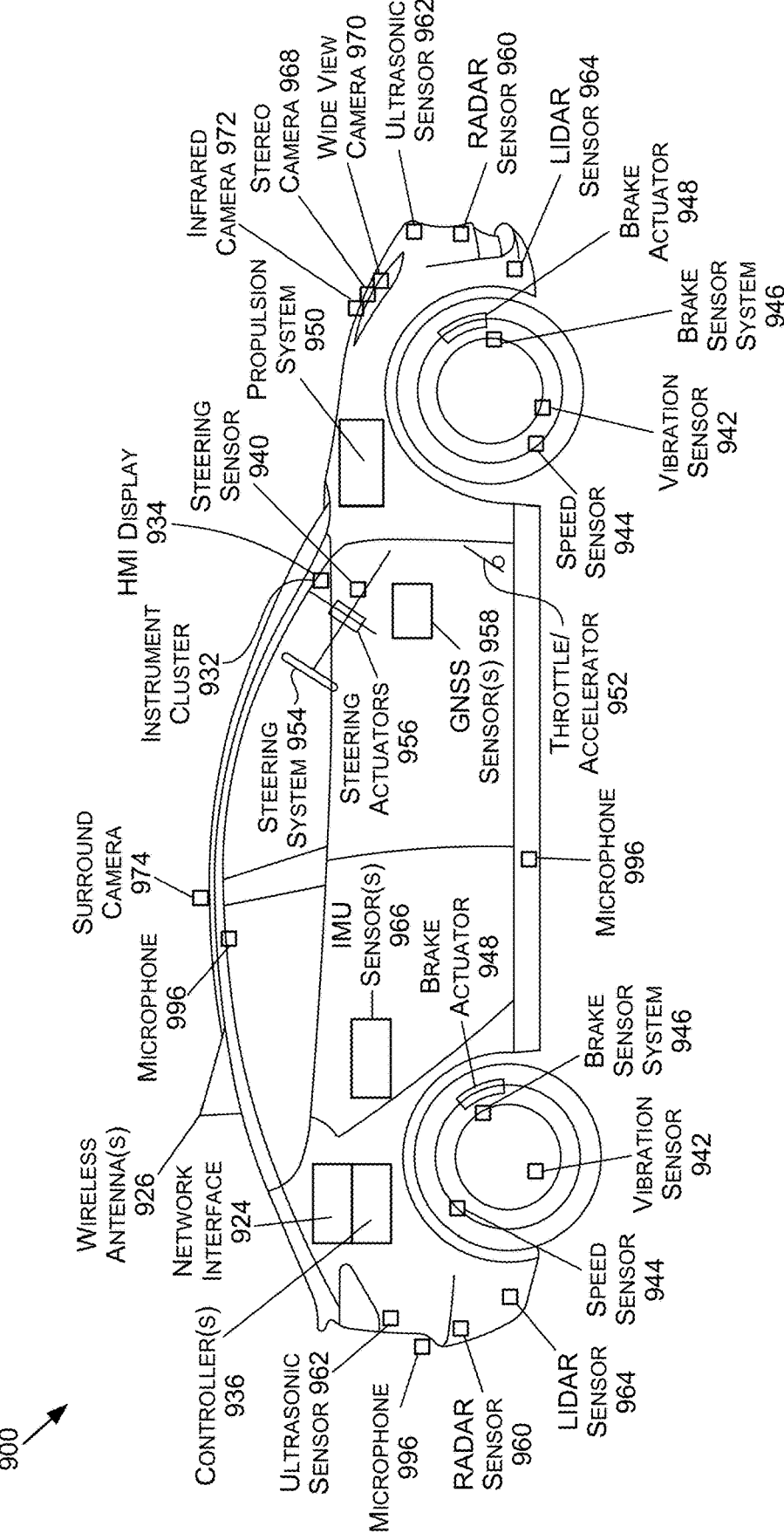
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s)

926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
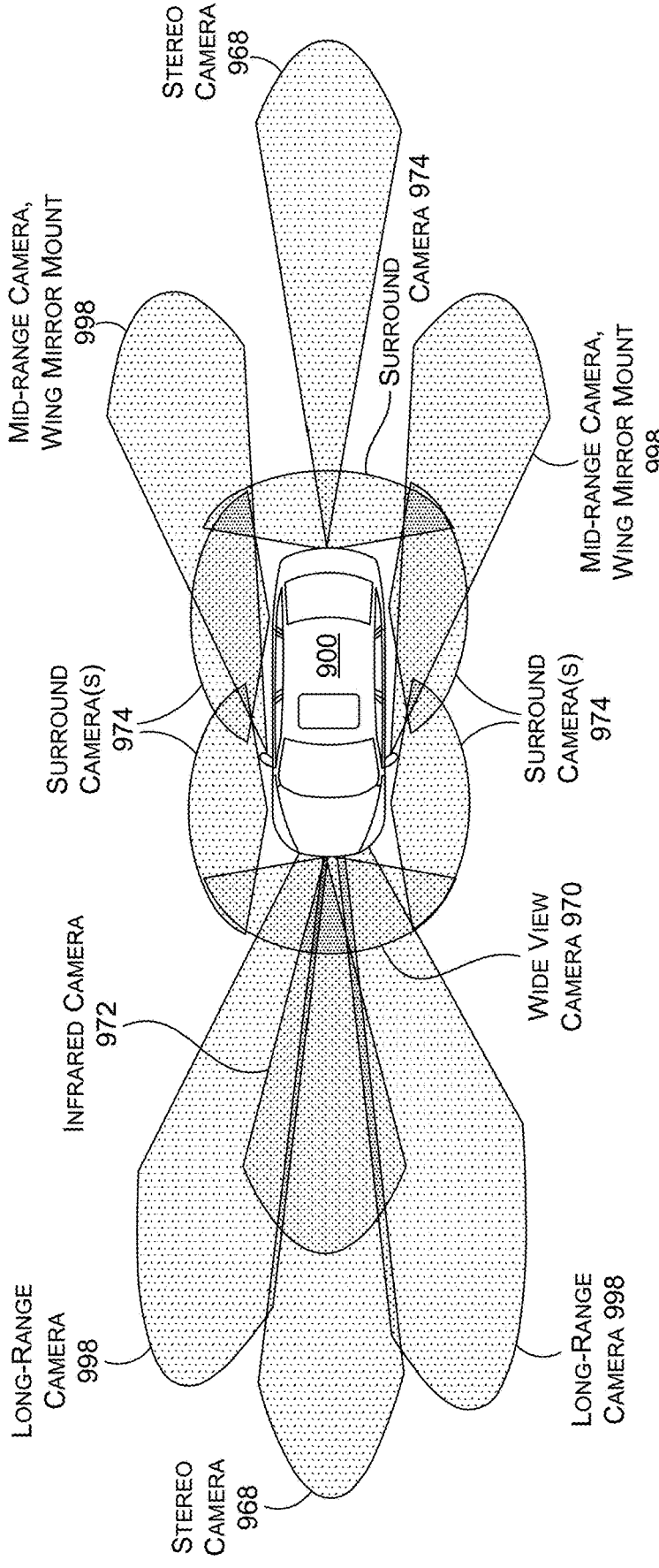
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
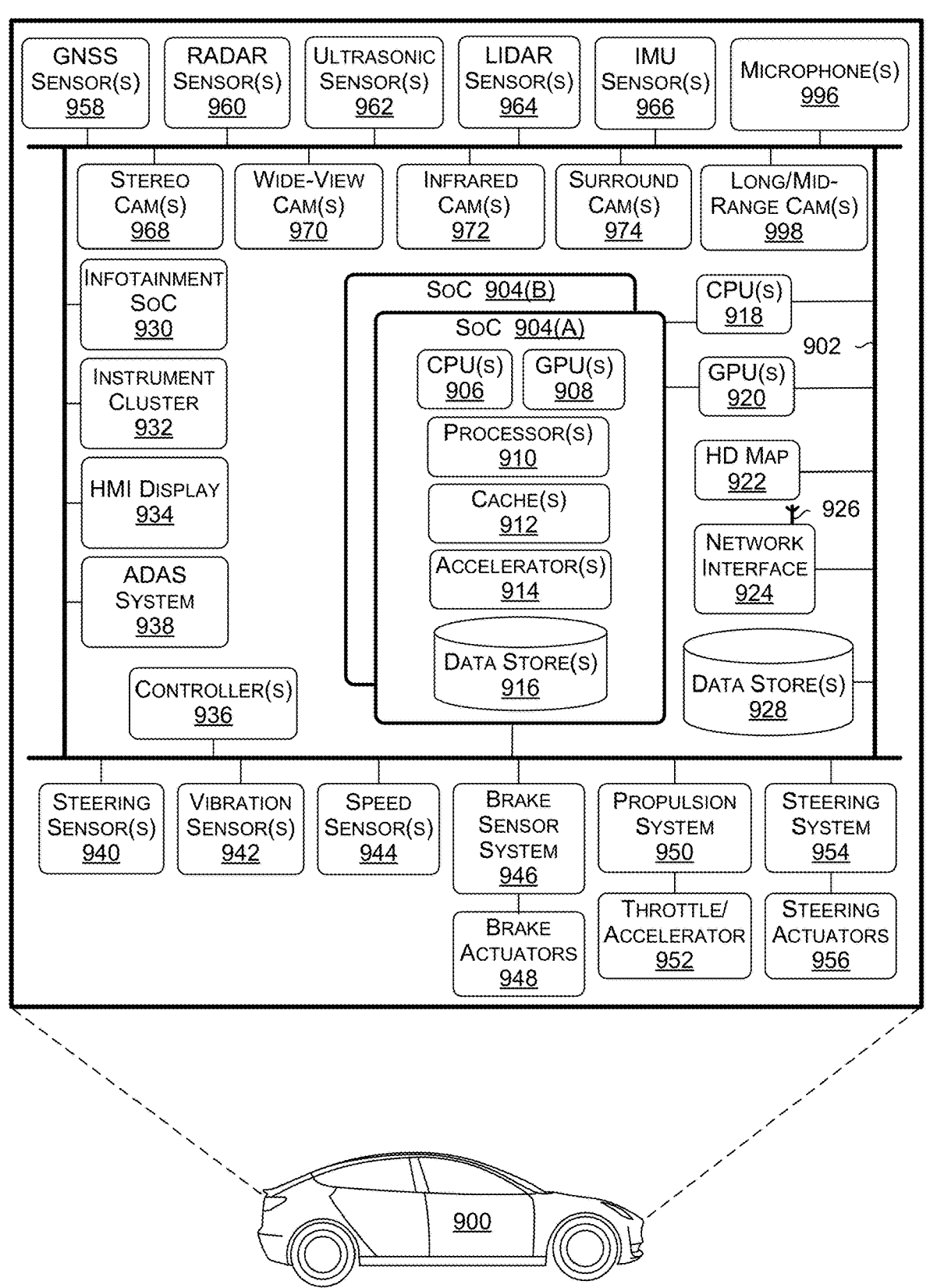
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR CORES for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
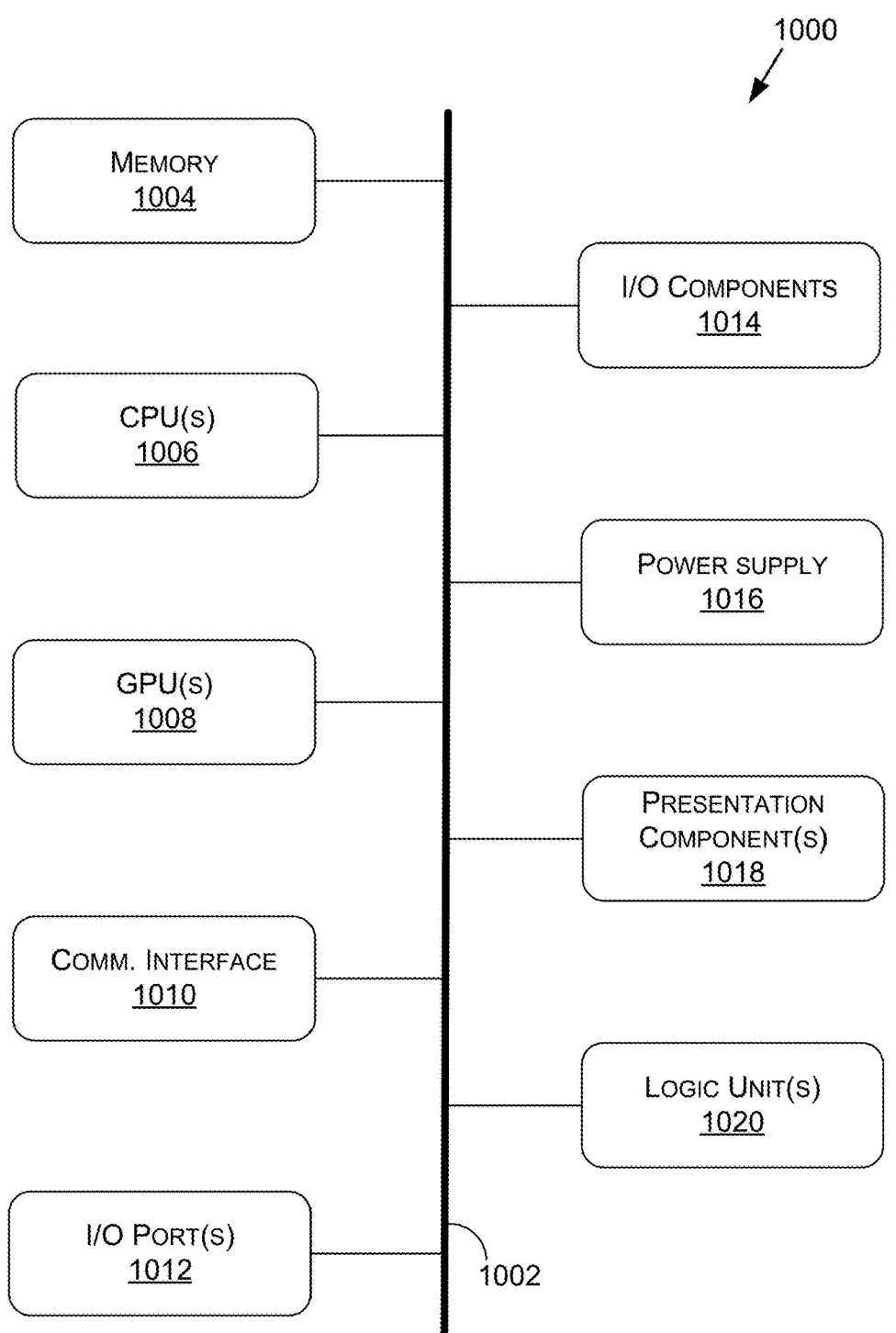
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
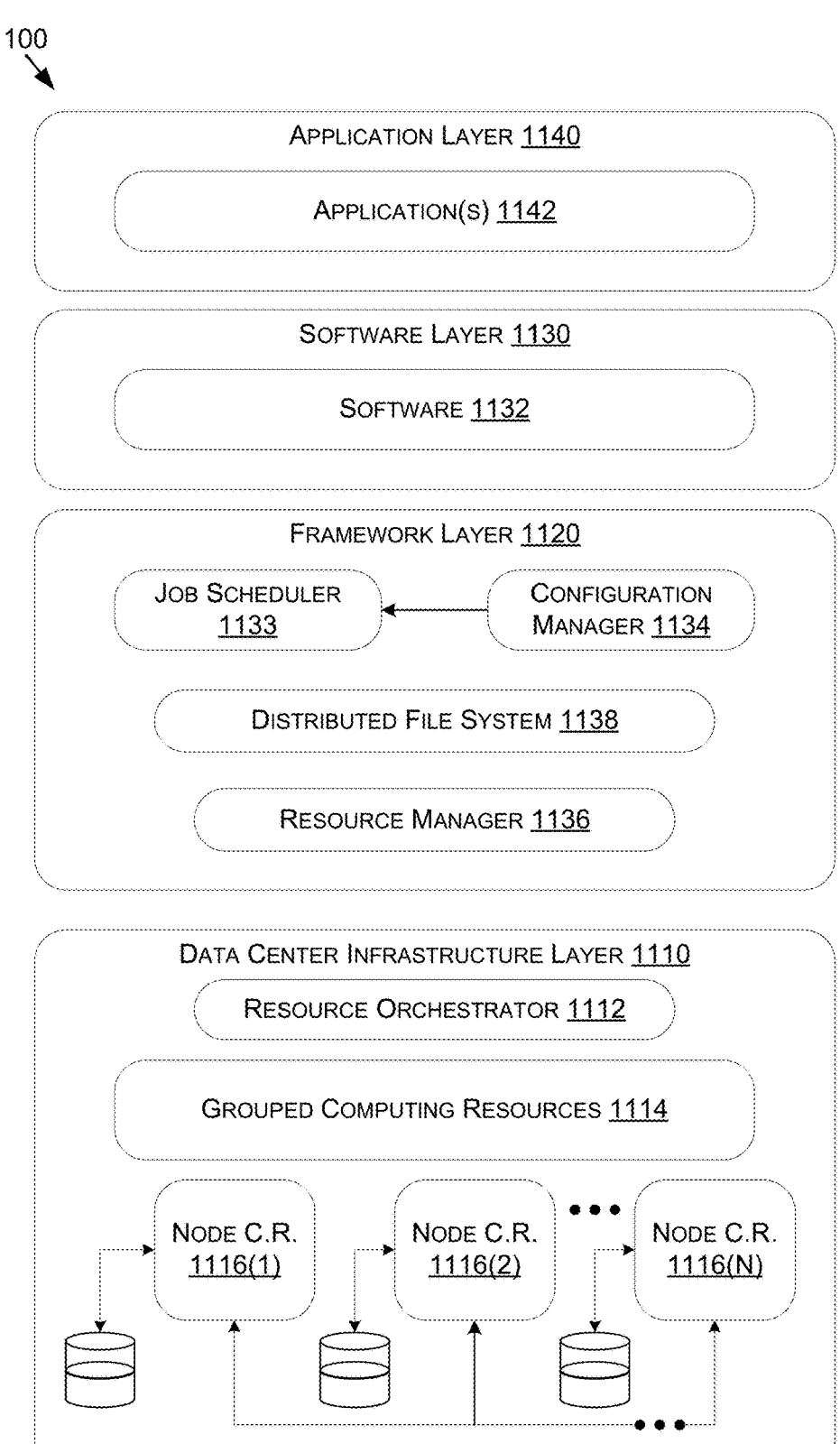
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    determining one or more first parameters corresponding to an object in an environment, the one or more first parameters including at least a first direction of travel of the object;
    determining one or more second parameters corresponding to an ego-machine in the environment, the one or more second parameters including at least a second direction of travel of the ego-machine;
    determining a perception zone based at least on the one or more first parameters, the one or more second parameters, and an assumption that the object is going to change from navigating in the first direction of travel to navigating in a third direction of travel to attempt to collide with the ego-machine, the perception zone extending from the ego-machine and at least partially towards the object based at least on the third direction of travel; and
    causing the ego-machine to navigate based at least on the perception zone.

2. The method of claim 1, further comprising:
    determining that the object is located within the perception zone,
    wherein the causing the ego-machine to navigate is performed in view of the object being located within the perception zone.

3. The method of claim 1, further comprising:
    determining that the object includes a safety-critical object based at least on the object being located within the perception zone,
    wherein the causing the ego-machine to navigate is based at least on the object including the safety-critical object.

4. The method of claim 1, further comprising:
    determining that the object is located outside of the perception zone,
    wherein the causing the ego-machine to navigate is performed in view of the object being located outside of the perception zone.

5. The method of claim 1, further comprising:
    determining that the object does not include a safety-critical object based at least on the object being located outside of the perception zone,
    wherein the causing the ego-machine to navigate is based at least on the object not including the safety-critical object.

6. The method of claim 1, wherein at least one of:
    the one or more first parameters further include at least one of a type of the object, a location of the object, a velocity of the object, an acceleration of the object, a deceleration of the object, a size of the object, or one or more steering limits for the object; or
    the one or more second parameters further include at least one of a type of the ego-machine, a location of the ego-machine, a velocity of the ego-machine, an acceleration of the ego-machine, a deceleration of the ego-machine, a size of the ego-machine, or one or more steering limits for the ego-machine.

7. The method of claim 1, wherein the determining the perception zone is further based at least on at least one of:
    an assumption that the ego-machine navigates towards the object;
    an assumption that a surface between the ego-machine and the object is flat; or
    an assumption that no other object is present between the ego-machine and the object.

8. The method of claim 1, wherein at least one of the determining the one or more first parameters or the determining the one or more second parameters is based at least on data generated using at least one of:
    a real-world sensor of the ego-machine;
    a virtual sensor of a virtual representation of the ego-machine; or
    a simulation engine.

9. The method of claim 1, wherein the determining the perception zone comprises determining, using one or more reachability algorithms, the perception zone based at least on the one or more first parameters, the one or more second parameters, and the assumption that the object is going to change from navigating in the first direction of travel to navigating in the third direction of travel to attempt to collide with the ego-machine.

10. The method of claim 1, wherein at least one of the determining the one or more first parameters or the determining the one or more second parameters uses one or more neural networks (NNs).

11. A system comprising:

one or more processors to:

determine one or more first parameters associated with an object located within an environment, the one or more first parameters including at least a first location and a first direction of travel of the object; determine one or more second parameters associated with an ego-machine located within the environment, the one or more second parameters including at least a second location and a second direction of travel of the ego-machine; determine, based at least on the second direction of travel of the ego-machine and an assumption that the object is going to change from navigating in the first direction of travel to navigate in a third directed of travel to attempt to collide with the ego-machine, a perception zone corresponding to the ego-machine, the perception zone including an area of the environment that extends from the second location of the ego-machine and at least partially towards the first location of the object; and cause, based at least on the perception zone and a determination of whether the object is located within the perception zone, the ego-machine to navigate.

12. The system of claim 11, wherein the one or more processors are further to:

determine whether the object is a safety-critical object based at least on whether the object is located in the perception zone, wherein the ego-machine is caused to navigate based at least on the determination of whether the object is the safety-critical object.

13. The system of claim 11, wherein at least one of:

the one or more first parameters further include at least one of a type of the object, a velocity of the object, an acceleration of the object, a deceleration of the object, a size of the object, or one or more steering limits for the object; or the one or more second parameters further include at least one of a type of the ego-machine, a velocity of the ego-machine, an acceleration of the ego-machine, a deceleration of the ego-machine, a size of the ego-machine, or one or more steering limits for the ego-machine.

14. The system of claim 11, wherein the perception zone is further determined based at least on at least one of:

an assumption that the ego-machine navigates towards the object;

an assumption that the object navigates towards the ego-machine; an assumption that a surface between the ego-machine and the object is flat; or an assumption that no other object is present between the ego-machine and the object.

15. The system of claim 11, wherein the system is comprised in at least one of:

a control system for an autonomous or semi-autonomous machine;

a perception system for an autonomous or semi-autonomous machine; a system for performing simulation operations;

a system for performing digital twin operations;

a system for performing real-time streaming;

a system for generating or presenting virtual reality (VR) content; a system for generating or presenting augmented reality (AR) content;

a system for generating or presenting mixed reality (MR) content;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

16. One or more processors comprising:

processing circuitry to:

determine, based at least on sensor data obtained using one or more sensors of an ego-machine, at least a first dynamic model indicating at least a first direction of travel of the ego-machine and a second dynamic model indicating at least a second direction of travel of an object;

determine, based at least on the first direction of travel, the second direction of travel, and an assumption that the object will change from navigating in the second direction of travel to navigating in a third direction of travel to attempt to collide with the ego-machine, a perception zone associated with that includes an area of an environment that extends from a first location of the ego-machine and at least partially towards a second location of the object;

determine whether the object is located within the perception zone; and cause the ego-machine to navigate based at least on the determination of whether the object is located within the perception zone.

17. The one or more processors of claim 16, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing real-time streaming;

a system for generating or presenting virtual reality (VR) content;

a system for generating or presenting augmented reality (AR) content;

a system for generating or presenting mixed reality (MR) content;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

18. The one or more processors of claim 16, wherein the processing circuitry is further to:

determine, based at least on whether the object is located within the perception zone, whether the object includes a safety-critical object, wherein the ego-machine is caused to navigate based at least on the determination of whether the object includes the safety-critical object.

19. The one or more processors of claim 16, wherein the perception zone is further determined based at least on an assumption that the ego-machine will change from navigating in the first direction of travel to navigating in a fourth direction of travel to attempt to collide with the object.

20. The one or more processors of claim 16, wherein the perception zone is further determined based at least on an assumption that no other object is located between the ego-machine and the object.

\* \* \* \* \*